(12) United States Patent
Yamamoto et al.

(10) Patent No.: US 8,071,250 B2
(45) Date of Patent: Dec. 6, 2011

(54) FUEL CELL STACK

(75) Inventors: Jun Yamamoto, Tokyo (JP); Satoshi Mogi, Yamato (JP); Akiyoshi Yokoi, Yokohama (JP); Atsuhito Yoshizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 12/372,254

(22) Filed: Feb. 17, 2009

(65) Prior Publication Data

US 2009/0208787 A1 Aug. 20, 2009

(30) Foreign Application Priority Data

Feb. 18, 2008 (JP) ................... 2008-036601

(51) Int. Cl.
*H01M 8/24* (2006.01)
*H01M 8/04* (2006.01)
*H01M 8/10* (2006.01)

(52) U.S. Cl. ...................... 429/457; 429/456

(58) Field of Classification Search ................. None
See application file for complete search history.

(56) References Cited

U.S. PATENT DOCUMENTS

| | | | | |
|---|---|---|---|---|
| 7,638,224 | B2 * | 12/2009 | Mogi et al. | 429/459 |
| 7,745,063 | B2 * | 6/2010 | Akiyama et al. | 429/514 |
| 7,838,168 | B2 * | 11/2010 | Salter et al. | 429/512 |
| 2005/0238943 | A1 | 10/2005 | Akiyama et al. | |
| 2007/0099061 | A1 * | 5/2007 | Na et al. | 429/38 |
| 2007/0190383 | A1 | 8/2007 | Mogi et al. | |
| 2008/0138692 | A1 | 6/2008 | Mogi et al. | |

FOREIGN PATENT DOCUMENTS

| | | |
|---|---|---|
| JP | 2004-311279 A | 11/2004 |
| JP | 2005-340173 A | 12/2005 |

* cited by examiner

*Primary Examiner* — John S Maples
(74) *Attorney, Agent, or Firm* — Fitzpatrick, Cella, Harper & Scinto

(57) ABSTRACT

A conductance at an oxidizer flow path forming member is defined as C1, a conductance at an opening portion of the oxidizer flow path forming member at which an oxidizer flow rate regulating portion is arranged is defined as C2, the conductances have a relationship of C1>C2. Further, the fuel cell stack has at least one inner fuel cell unit having a value of C1/C2 which is larger than values of C1/C2 of fuel cell units located at both ends of the fuel cell stack.

12 Claims, 17 Drawing Sheets

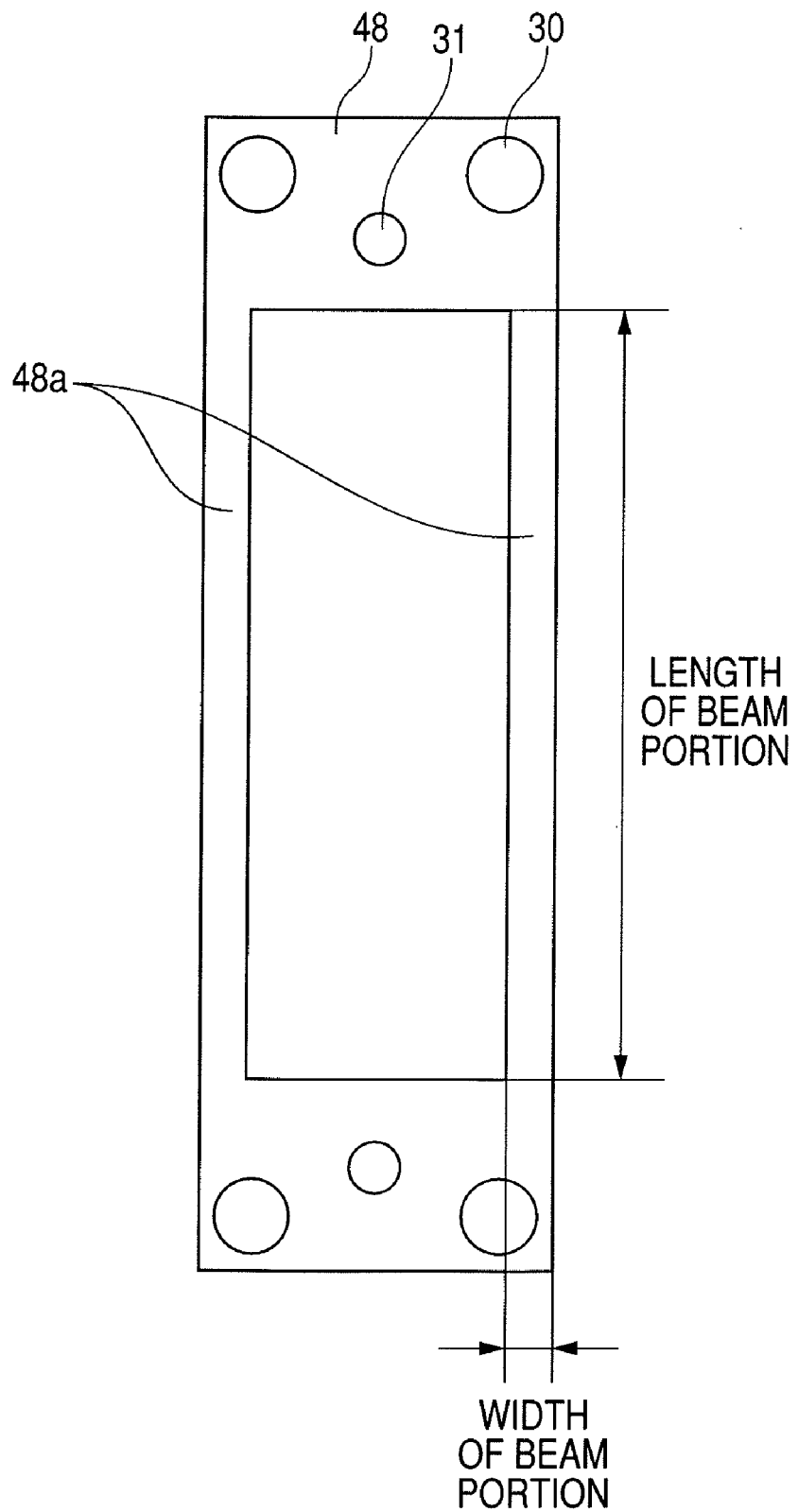

FUEL CELL STACK

This application claims priority from Japanese application 2008-036601, filed 18 Feb. 2008.

BACKGROUND OF THE INVENTION

1. Field of the Invention

The present invention relates to a fuel cell stack, and more particularly to an oxidizer flow path of a fuel cell stack.

2. Description of the Related Art

A polymer electrolyte fuel cell basically includes a polymer electrolyte membrane having proton conductivity, and a pair of catalytic layers and electrodes arranged at both sides of the polymer electrolyte membrane.

The catalytic layer is generally composed of platinum or a platinum-group metal catalyst. A gas diffusion layer that supplies gas and collects electricity is provided at the outer surface of the catalytic layer.

An assembly in which the polymer electrolyte membrane and the catalytic layer are integrated is referred to as a membrane electrode assembly (MEA). In the membrane electrode assembly, fuel (hydrogen) is supplied to one electrode, while oxidizer (oxygen) is supplied to the other electrode, whereby electricity is generated during the process of generating water.

The electrode to which the fuel is supplied is referred to as a fuel electrode, while the electrode to which the oxidizer is supplied is referred to as an oxidizer electrode. Power is taken out from the electrodes at both sides.

The theoretical voltage of a fuel cell unit made of a membrane electrode assembly is approximately 1.23 V. In a normal operation state, the fuel cell unit is mostly used with the theoretical voltage being set to about 0.7 V.

Therefore, in a case where it requires a higher activation voltage, a plurality of fuel cell units are stacked and arranged electrically in series to be used.

The stack structure described above is referred to as a fuel cell stack. Usually, the oxidizer flow path and the fuel flow path are isolated from each other by means of a member, which is called a separator, in the stack. A recess/protrusion pattern (groove) is formed in the respective plate-shaped separators, wherein the recessed portion facing the membrane electrode assembly is configured as a gas flow path, while the protruding portion is configured as a current-collecting portion.

In a fuel cell used in a portable electronic device, air that is the oxidizer is taken in such that outside air is directly supplied due to a natural diffusion or a ventilation means such as a fan. In the stack structure, air is taken in from only a side surface of the stack.

In the fuel cell stack described above, a plurality of cell units simultaneously generate electricity. However, since the plurality of cell units are stacked, the rate of heat radiation differs for each part.

Specifically, heat is more likely to be accumulated in the cell units located at the central position in the stacking direction, while heat is more likely to be radiated at the cell units located at both ends.

Therefore, a temperature distribution will be formed such that the temperature is the highest at the central part and the temperature is relatively lower at both ends in the stacking direction of the fuel cell stack.

Due to the temperature distribution, each cell unit of the fuel cell stack will generate electricity under the different temperature condition.

Accordingly, the disadvantages described below likely to occur.

Firstly, a so-called flooding phenomenon is more likely to occur at the cell units located at the uppermost part or the lowermost part in the stacking direction.

The flooding phenomenon refers to a phenomenon in which water generated at the oxidizer electrode is condensed, and the condensed water degrades the gas diffusion property in the oxidizer electrode to thereby cause degradation of the characteristics. When the temperature distribution occurs in the stack, water is easier to be condensed at the cell unit having a low temperature. Therefore, the flooding phenomenon is more likely to occur at the cell units located at both ends.

A so-called dry out phenomenon is likely to occur at the cell units located at the central part in the stacking direction. The dry out phenomenon refers to a phenomenon in which water content in the polymer electrolyte decreases with the temperature rise, which increases the internal resistance in the cell unit to thereby cause degradation of the characteristics.

Since water, which is generated at the oxidizer electrode, is more rapidly evaporated at the cell unit having a higher temperature, the dry out phenomenon is more likely to occur at the cell units located at the central part.

In order to eliminate the instability of the characteristics due to such temperature distribution, Japanese Patent Application Laid-Open No. 2005-340173 proposes a fuel cell stack in which a distribution is given to the air-supply amount to each cell unit of a fuel cell stack.

In this fuel cell stack, the sectional area of an oxidizer flow path formed in a separator of each cell unit, which have the low temperature and are located at both ends, is set to be the largest.

By virtue of this structure, the amount of taking in the supplied air becomes large at the both ends. Therefore, even when the temperature is lower, water is hardly condensed, so that the variation in the degree of occurrence of the flooding phenomenon in the stacking direction is reduced.

Furthermore, Japanese Patent Application Laid-Open No. 2004-311279 proposes a fuel cell in which the sectional area of an oxidizer flow path of each cell unit at the central part in the fuel cell stack is set to be the largest.

This fuel cell is configured such that the air-supply amount is set to be the largest at the central part so as to increase the radiation amount of the cell units at the central part, due to heat exhaust through the air, thereby suppressing the dry out phenomenon.

However, the above-mentioned conventional fuel cells have the problems described below.

Specifically, in the fuel cell stack disclosed in Japanese Patent Application Laid-Open No. 2005-340173, the power generation temperature of the stack may vary greatly depending on the output required for the device or the operation environment factors.

Furthermore, the temperature distribution tends to increase, as the temperature of the whole stack becomes high. Therefore, when the temperature of the whole stack is low, the chances are small that the temperature of the cell units at the central part is prominently high.

In the fuel cell disclosed in Japanese Patent Application Laid-Open No. 2005-340173, the sectional area of the oxidizer flow path of the cell units at the central part in the stacking direction is relatively smaller, so that the amount of taking in air is reduced.

Therefore, when the power generation temperature of the fuel cell stack is not sufficiently raised, the flooding phenomenon is likely to occur at the cell units at the central part instead. However, this patent document does not disclose any countermeasure against such situation.

Apart from the external humidification type fuel cell stack in which humidified fuel or oxidizer is supplied, the technology disclosed in Japanese Patent Application Laid-Open No. 2004-311279 is not necessarily effective in a self-humidification type fuel cell stack that does not humidify the supplied gas.

Since the self-humidification type fuel cell stack directly takes in air from the outside, the humidity of the supplied air becomes relatively small, if the power generation temperature of the stack is higher than the outside temperature.

Supplying the air having such low humidity in a large amount to the central part that is likely to have a high temperature may allow the dry out phenomenon to be easy to occur.

SUMMARY OF THE INVENTION

The present invention aims to provide a fuel cell stack in which a distribution is given to the air supply amount so as to stably strike a balance between flooding resistance and dry out resistance with respect to a temperature distribution in the stacking direction.

(1) The fuel cell stack according to the present invention includes at least three fuel cell units stacked via separators, each fuel cell unit having:

a membrane electrode assembly having a fuel electrode and an oxidizer electrode disposed at both sides of a polymer electrolyte membrane;

an oxidizer flow path forming member disposed on the oxidizer electrode side and having an opening portion for supplying an oxidizer therethrough; and an oxidizer flow rate regulating portion disposed at the opening portion of the oxidizer flow path forming member, for regulating a flow rate of the oxidizer flowing in the oxidizer flow path forming member, wherein when a flow rate [sccm] per given pressure of the oxidizer in the oxidizer flow path forming member is defined as a conductance $C1$, and a flow rate [sccm] per given pressure of the oxidizer at the opening portion at which the oxidizer flow rate regulating portion is disposed is defined as a conductance $C2$, the conductances have a relationship of $C1>C2$, and at least one inner fuel cell unit except the fuel cell units located at both ends of the fuel cell stack has a value of $C1/C2$ which is larger than values of $C1/C2$ of the fuel cell units located at both ends of the fuel cell stack.

By virtue of the structure of the fuel cell stack in (1) above, the supply amount of the oxidizer (air) is small at the central part, but large at both ends in the stacking direction. Accordingly, the flooding phenomenon at both ends having a low temperature and the dry out phenomenon at the central part having a high temperature can be prevented.

(2) In the fuel cell stack according to the present invention, the values of the conductance $C1$ of the respective fuel cell units constituting the fuel cell stack are approximately identical to each other, and at least one inner fuel cell unit except the fuel cell units located at both ends of the fuel cell stack has a value of the conductance $C2$ which is smaller than values of the conductance $C2$ of the fuel cell units located at both ends of the fuel cell stack.

By virtue of the structure of the fuel cell stack in (2) above, since the values of the conductance $C1$ of the respective cell units in the vicinity of the oxidizer electrode are identical, the gas diffusion property at a part immediately above the power generation portion of each cell unit can more uniformly be maintained. Accordingly, even when the power generation temperature of the stack is not sufficiently raised, the state in which the flooding phenomenon is likely to occur in particular at the cell units at the central part in the stacking direction can be reduced.

(3) In the fuel cell stack according to the present invention, the value(s) of the conductance $C1$ of the inner fuel cell unit is larger than the value of the conductance $C1$ of each of the fuel cell units at both ends, and the value of the conductance $C2$ of the inner fuel cell unit is smaller than the value of the conductance $C2$ of each of the fuel cell units at both ends.

By virtue of the structure of the fuel cell stack in (3) above, even when the power generation temperature of the stack is not sufficiently raised, the resistance to the flooding phenomenon of the cell unit(s) located at the central part in the stacking direction can further be enhanced.

(4) In the fuel cell stack according to the present invention, the oxidizer flow path-forming member includes a metal foam.

By virtue of the structure of the fuel cell stack in (4) above, the uniformity in the gas diffusion can further be enhanced, and the uniformity in the current collection can further be enhanced.

(5) In the fuel cell stack according to the present invention, the oxidizer flow rate regulating portion includes a member for reducing the opening area of the opening portion.

By virtue of the structure of the fuel cell stack in (5) above, the gas diffusion property itself at the portion of the cell unit corresponding to the membrane electrode assembly is less reduced even when the oxidizer flow rate regulating portion is provided.

(6) In the fuel cell stack according to the present invention, the member for reducing the opening area of the opening portion is composed of a structure-shielding member for reducing the opening area.

By virtue of the structure of the fuel cell stack in (6) above, the conductance $C2$ can simply be adjusted through the simple configuration in which the shielding member is disposed at the opening portion of the oxidizer flow path-forming member.

(7) In the fuel cell stack according to the present invention, the structure-shielding member is a beam member.

By virtue of the structure of the fuel cell stack in (7) above, the opening area can simply be adjusted by using the beam member having no complicated shape.

(8) In the fuel cell stack according to the present invention, the beam member is disposed between the oxidizer flow path forming member and the membrane electrode assembly.

By virtue of the structure of the fuel cell stack in (8) above, since the beam member and the oxidizer flow path-forming member can be fitted to each other, the alignment is facilitated, and the assembly performance can be enhanced.

(9) In the fuel cell stack according to the present invention, the beam member is disposed between the oxidizer flow path forming member and the separator.

By virtue of the structure of the fuel cell stack in (9) above, the beam member can be formed integratedly with the separator, whereby the number of components can be reduced.

(10) In the fuel cell stack according to the present invention, the thickness of the beam member of the inner fuel cell unit constituting the fuel cell stack is larger than the thickness of the beam member of each of the fuel cell units located at both ends of the fuel cell stack.

By virtue of the structure of the fuel cell stack in (10) above, the conductance $C2$ can be adjusted through the simple structure in which the thickness of the beam member is varied.

(11) In the fuel cell stack according to the present invention, the member for reducing the opening area of the opening portion is formed of means for deforming a part of the opening portion by compression.

By virtue of the structure of the fuel cell stack in (11) above, the oxidizer flow path-forming member itself can adjust the conductance, which eliminates the need of disposing the shielding member, so that the number of components can be reduced.

The present invention can realize a fuel cell stack in which a distribution is given to the air supply amount so as to stably strike a balance between flooding resistance and dry out resistance with respect to a temperature distribution in the stacking direction.

Further features of the present invention will become apparent from the following description of exemplary embodiments with reference to the attached drawings.

BRIEF DESCRIPTION OF THE DRAWINGS

FIG. 11 is a cross-sectional view, taken along line C-C in FIG. 10, for explaining the structure of the fuel cell stack according to Embodiment 1 of the present invention.

DESCRIPTION OF THE EMBODIMENTS

The embodiments of the present invention will be described in detail below.

Figure 1:
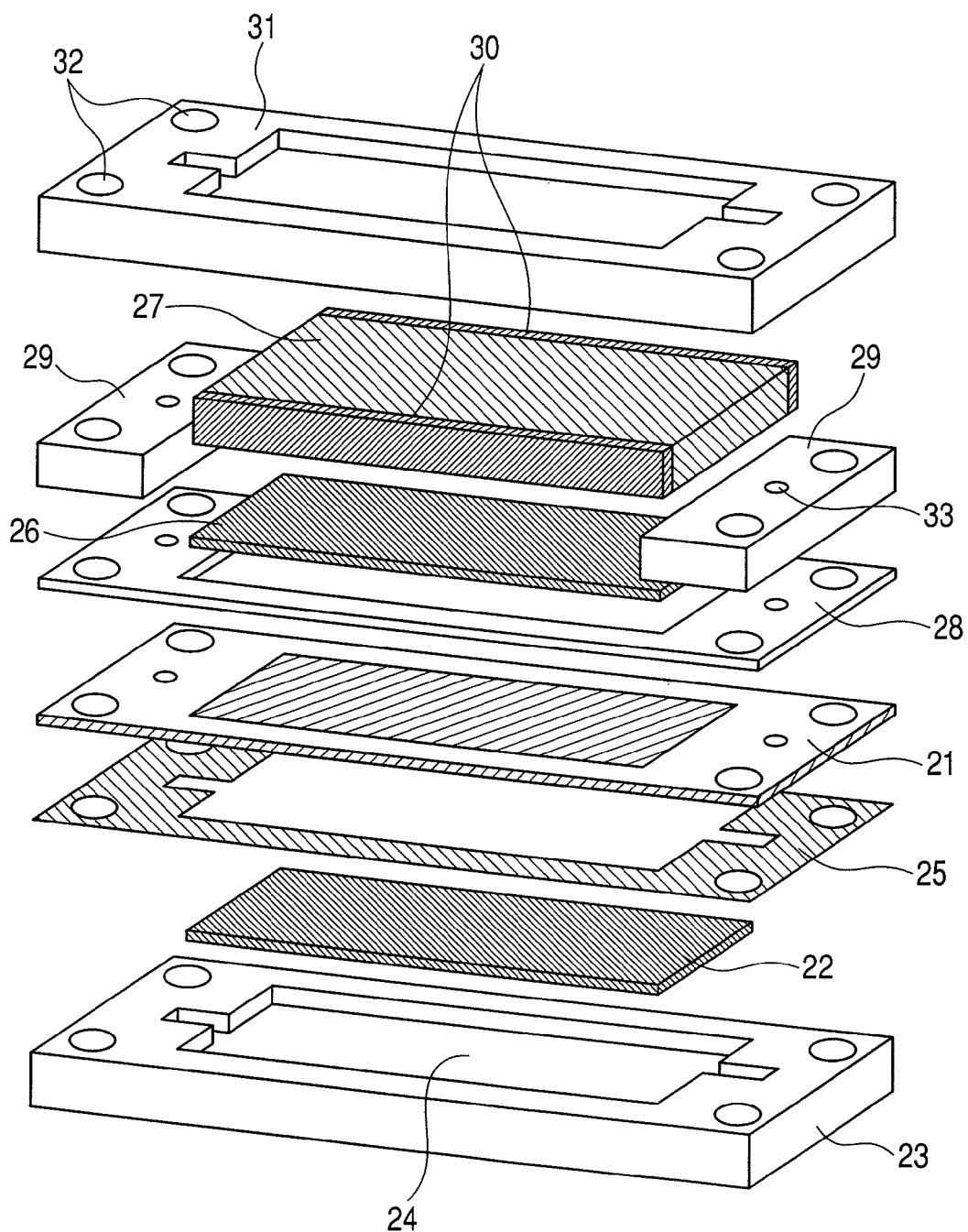
FIG. 1 is an exploded perspective view for explaining a structure of a fuel cell unit in a fuel cell stack according to an embodiment of the present invention.

FIG. 1 is a schematic exploded perspective view for explaining the structure of a cell unit constituting a fuel cell stack according to the present embodiment.

Figure 2:
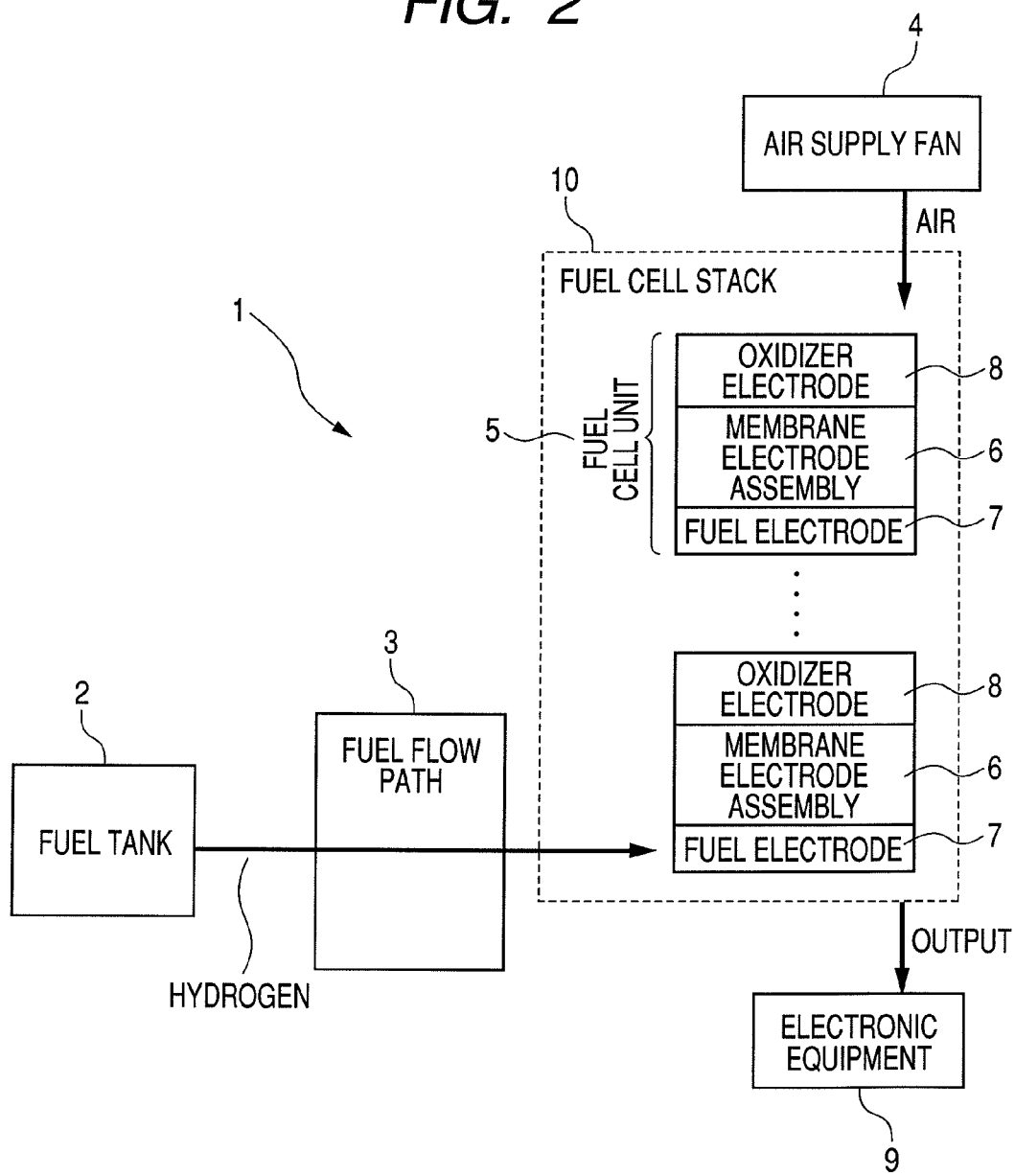
FIG. 2 is a diagram for explaining a schematic structure of a fuel cell system according to an embodiment of the present invention.
Figure 3:
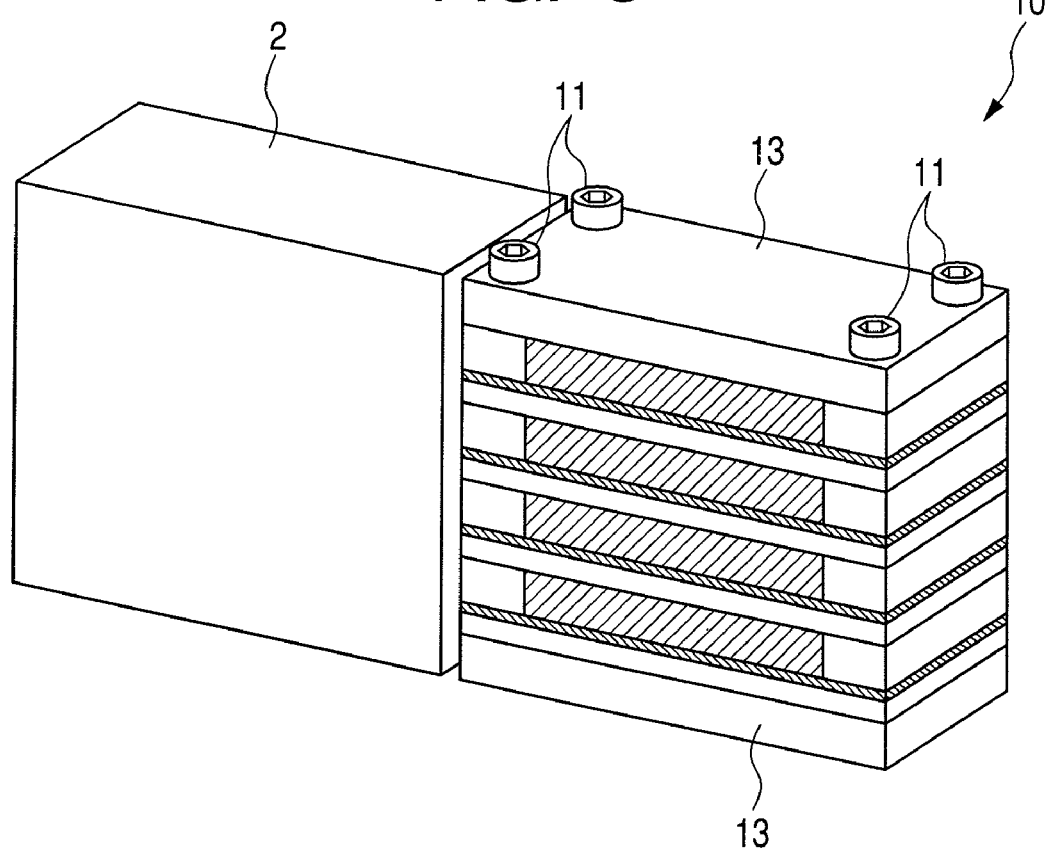
FIG. 3 is a perspective view for explaining the structure of a fuel cell stack according to an embodiment of the present invention.

FIG. 2 is a diagram for explaining a schematic structure of a fuel cell system according to the present embodiment.

The fuel cell system according to the present embodiment includes a fuel cell stack having at least three cell units stacked via separators (bipolar plates). Each of the cell units is composed of the components as shown in FIG. 1. Each of the cell units is configured such that, when a flow rate [sccm] per given pressure of an oxidizer in an oxidizer flow path forming member of the cell unit is defined as a conductance $C_1$, and a flow rate [sccm] per given pressure of the oxidizer at an opening portion at which an oxidizer flow rate regulating portion is disposed is defined as a conductance $C_2$, the conductances $C_1$ and $C_2$ are made different from each other.

In FIG. 2, reference numeral 1 denotes a fuel cell system, 2 denotes a fuel tank, 3 denotes a fuel flow path, 4 denotes an air supply fan, 5 denotes a fuel cell unit, 6 denotes a membrane electrode assembly, 7 denotes a fuel electrode, 8 denotes an oxidizer electrode, 9 denotes an electronic equipment, and 10 denotes a fuel cell stack.

The fuel cell system 1 according to the present embodiment includes a power generation portion including the fuel electrode and the oxidizer electrode, and the fuel tank that supplies fuel to the power generation portion.

A system that supplies any fuels, such as pure hydrogen or methanol can be employed.

As a basic structure of the power generation portion of the fuel cell unit, the fuel cell unit has the membrane electrode assembly 6 made of a polymer electrolyte membrane, which has catalytic layers at both sides and has proton conductivity, and two electrodes, which are the fuel electrode 7 and the oxidizer electrode 8, formed on the respective catalyst layers at both sides. Each of the two electrodes is composed of a gas diffusion layer, a flow path forming member, and the like.

Fuel is supplied to the fuel electrode from the fuel tank 2 through the fuel flow path 3, while outside air is supplied to the oxidizer electrode with the air supply fan 4.

Any tanks may be employed as the fuel tank 2, so long as they can supply fuel to the fuel cell.

Examples of the fuel include pure hydrogen, hydrogen stored in a hydrogen storage material, or liquid fuel such as methanol or ethanol.

Furthermore, there may be employed a system which has the liquid fuel and a reformer thereof, and supplies a reformed hydrogen to the fuel cell.

In order to obtain a fuel cell having a high output density, a system for supplying pure hydrogen as a fuel is preferably employed. If a hydrogen storage alloy is used for the fuel tank, the pure hydrogen can be stored more efficiently at a lower pressure.

For the fuel flow path 3, a sealing material is disposed at connection portions between components in order that the hydrogen fuel supplied from the fuel tank does not leak to the outside of the system.

Next, the structure of the cell unit of the fuel cell stack according to the present embodiment will be described with reference to FIG. 1.

In FIG. 1, numeral 21 denotes the membrane electrode assembly, 22 and 26 denote gas diffusion layers, 23 and 31 denote electrode plates, 24 denotes a fuel electrode chamber, 25 denotes a sealing material, 27 denotes an oxidizer flow path forming member, 28 denotes a support member, 29 denotes a structure retaining member, 30 denotes an oxidizer flow rate regulating portion, 32 denotes a bolt hole, and 33 denotes a fuel flow path.

The configuration of the fuel cell unit according to the present embodiment includes, on the fuel electrode side, the electrode plate 23, the gas diffusion layer 22, and the sealing material 25, and, on the oxidizer electrode side, the gas diffusion layer 26, the oxidizer flow path forming member 27, the support member 28, the structure retaining members 29, the oxidizer flow rate regulating portion 30, and the electrode plate 31, with the membrane electrode assembly 21 being sandwiched by the components on the fuel electrode side and the components on the oxidizer electrode side.

The electrode plate 23 at the fuel electrode side is made of a conductive metal, such as stainless steel plated with gold. The fuel electrode chamber 24 is provided at the position corresponding to the fuel electrode.

The gas diffusion layer 22 is made of a conductive material having gas permeability such as carbon paper or carbon cloth, and housed in the fuel electrode chamber.

The sealing material 25 is a material that has a sealing function. It is arranged so as to enclose the outer peripheral edge of the electrode plate. The sealing material 25 forms a closed space between the membrane electrode assembly 21 and the electrode plate 23 upon the clamping so as to prevent the leak of hydrogen from the fuel electrode chamber.

A gasket, O-ring, adhesive, or the like is used for the sealing material.

On the oxidizer electrode side, the gas diffusion layer 26 and the oxidizer flow path forming member 27 are stacked, and the oxidizer flow rate regulating member 30 is arranged at the opening portion of the oxidizer flow path forming member 27.

As with the gas diffusion layer 22 on the fuel electrode side, carbon paper, carbon cloth, or the like is used for the gas diffusion layer 26.

Stainless steel or an alloy such as nickel-chrome may be used for the material of the oxidizer flow path forming member 27.

Metal foam, which is obtained by porousifying the metals described above, can preferably be used for the oxidizer flow path forming member 27, since it can form a flow path with high uniformity and has excellent current collecting property from the electrode member.

Furthermore, there may be desirably used a parallel columnar member including columnar members made of the above-mentioned metal or a three-dimensional grid-shaped member because by using those members, a larger flow path can be formed and the risk of the flow path being blocked by generated water can be reduced.

The support member 28 is disposed in a position surrounding the periphery of a contact portion between the gas diffusion layer 26 and the membrane electrode assembly 21 and corresponding to the sealing material 25 at the fuel electrode side.

For the material of the support member 28, conductivity is not required, but high corrosion resistance and high rigidity are required. Accordingly, metals such as stainless steel, ceramics, or plastics may be used.

Furthermore, the oxidizer flow path-forming member 27 is provided to the surface of the support member 28 opposite to the surface being in contact with the polymer electrolyte membrane. At the time of clamping, pressure is directly or indirectly applied from the oxidizer flow path-forming member 27 to at least a part of the support member 28.

By virtue of this operation, the clamping pressure can be applied to the sealing material in a uniform manner, whereby the fuel is more surely sealed.

The structure-retaining member 29 is formed of a member at least having a higher rigidity than that of the oxidizer flow path-forming member 27. By defining the height of the cell unit, specifically, the thickness of the gas diffusion layer 26 and the oxidizer flow path forming member 27, the structure retaining member 29 prevents excessive deformation of the gas diffusion layer 26 and the oxidizer flow path forming member 27.

Furthermore, the structure-retaining member 29 has bolt holes 32.

Moreover, the fuel flow path 33 is formed in the structure-retaining member 29. After the fuel cell stack is assembled, the fuel flow paths 31 serves as fuel manifolds in the stacking direction of the cell unit.

In order to prevent leakage of the fuel from the fuel manifold, it is desirable that a sealing material be appropriately inserted between the respective components depending on the type of the fuel.

Since the fuel manifold formed as described above is formed by the structure retaining member 29 having the high rigidity, leakage of the fuel due to deformation or displacement at the time of or after the clamping can be prevented.

As the high-rigidity material suitably used as the material of the structure-retaining member 29, there are included metals such as stainless steel, ceramics, and plastics.

When the structure-retaining member is provided on the support member, the clamping pressure is transmitted to the support member through the structure-retaining member, which is desirable for improving alignment accuracy of the support member.

The structure retaining member 29 and the support member 28 may be structured separately. However, when the structure-retaining member 29 and the support member 28 are integrated into one body, an alignment operation at the time of manufacturing the fuel cell is not necessary.

The oxidizer flow rate regulating portion 30 is formed at the opening portion of the oxidizer flow path-forming member 27. The oxidizer flow rate regulating portion 30 may be provided to the whole surface of the opening portion or a part of the opening portion.

The oxidizer flow rate regulating portion 30 may be disposed at one side of the opening portion, or at both sides of the opening portion. The oxidizer flow rate regulating portion 30 is a member that reduces the opening area of the oxidizer flow path-forming member, i.e., a structure-shielding member. The shape or the material thereof may appropriately be selected. The oxidizer flow rate regulating portion may be a plate-shaped member, beam-shaped member, or mesh-shaped member.

The oxidizer flow rate regulating portion 30 may be a filter member having a porosity smaller than the porosity of the oxidizer flow path-forming member. Alternately, the oxidizer flow rate regulating portion 30 may be made of a viscous material, which impregnates the vicinity of the opening portion of the oxidizer flow path forming member so as to shield the opening portion.

Alternately, means for compressing and deforming apart of the opening portion is employed to reduce the opening area of a part of the opening portion. Therefore, the opening portion itself may form the oxidizer flow rate regulating portion.

The present embodiment provides a fuel cell stack obtained by stacking a plurality of fuel cell units each having a difference in conductance.

When a flow rate [sccm] per given pressure of the oxidizer in the oxidizer flow path forming member of the cell unit is defined as a conductance $C1$, and a flow rate [sccm] per given pressure of the oxidizer at the opening portion at which the oxidizer flow rate regulating portion is disposed is defined as a conductance $C2$, it is configured such that the conductance $C2$ is smaller in value than the conductance $C1$.

Therefore, the supply of air in the cell unit will be regulated by the conductance $C2$.

Next, description will be made of the fuel cell stack according to the present embodiment.

FIGS. 3, 4, 5, 6, 7, and 8 are views for explaining the structure of the fuel cell stack of the fuel cell according to the present embodiment.

Figure 5:
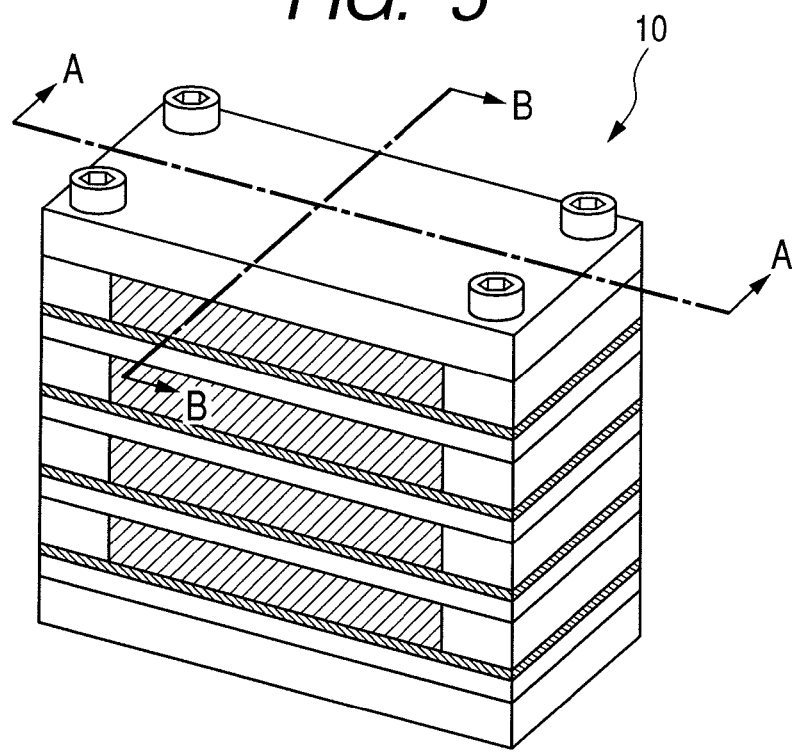
FIG. 5 is a perspective view for explaining the structure of the fuel cell stack according to the embodiment of the present invention.
Figure 6:
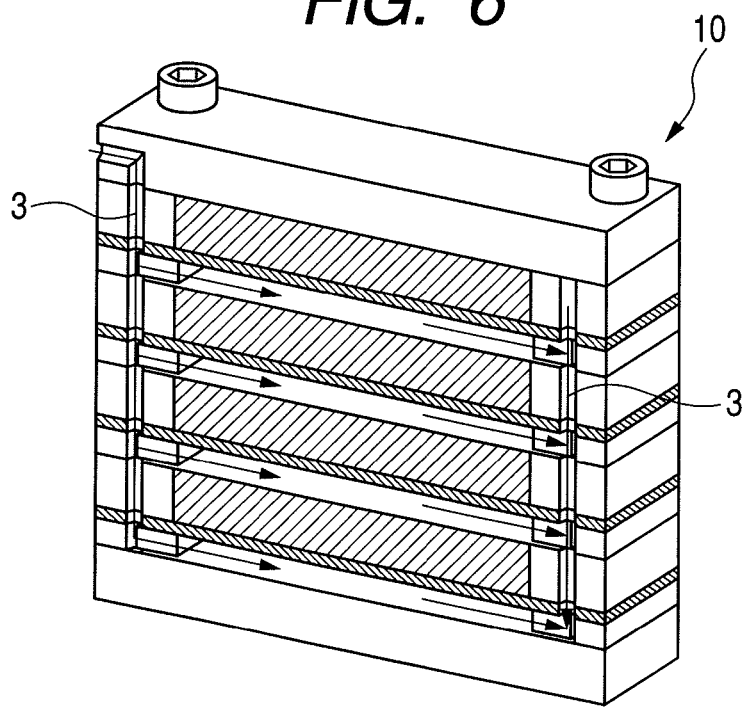
FIG. 6 is a cross-sectional view, taken along line A-A in FIG. 5, for explaining the structure of the fuel cell stack according to the embodiment of the present invention.
Figure 8:
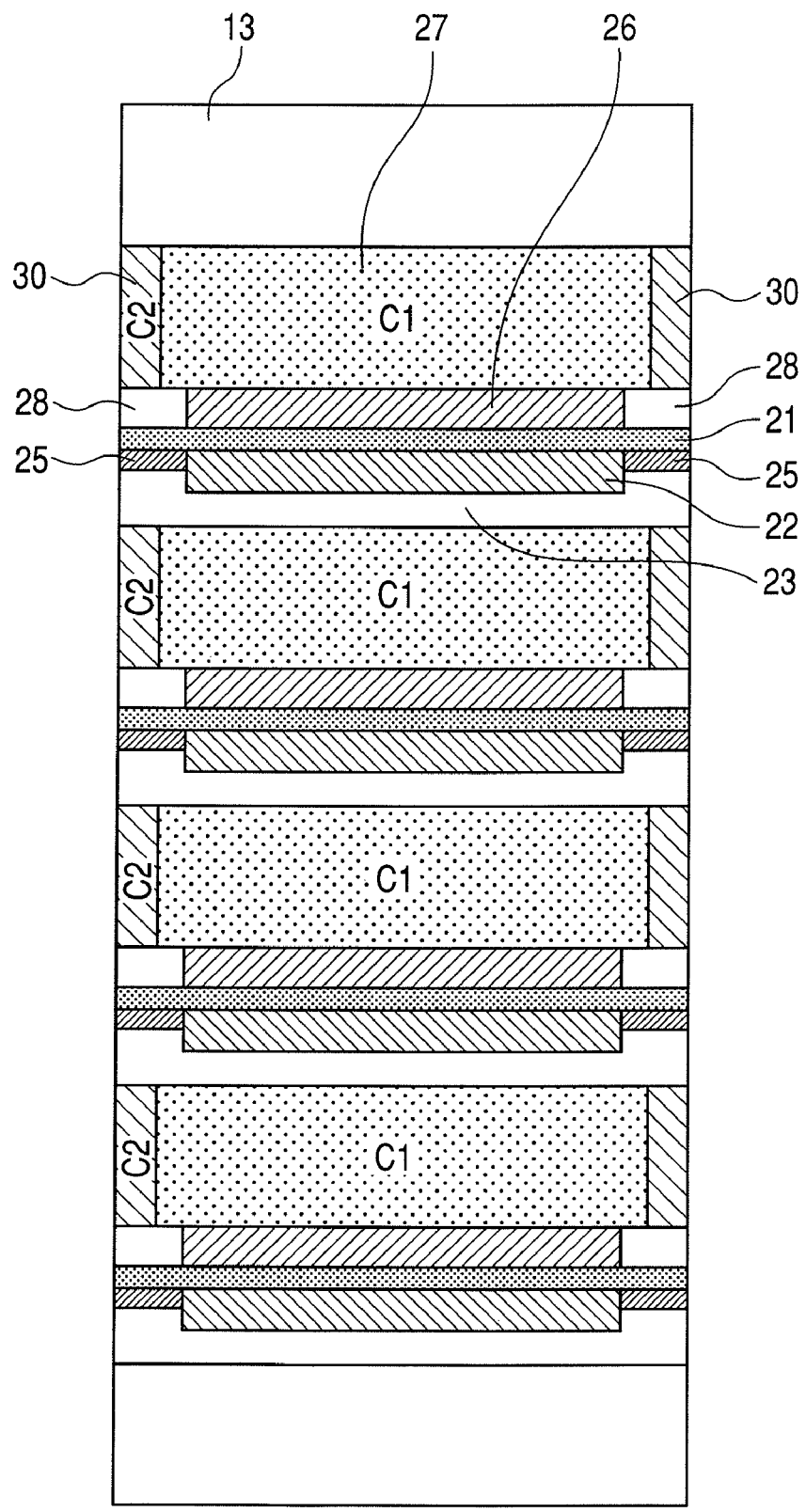
FIG. 8 is a cross-sectional view, taken along line B-B in FIG. 5, for explaining the structure of the fuel cell stack according to the embodiment of the present invention.

FIG. 6 is a cross-sectional view taken along line A-A in FIG. 5, and FIG. 8 is a cross-sectional view taken along line B-B in FIG. 5.

In FIGS. 3 to 8, there are illustrated the fuel cell stack 10, stack bolts 11, a coupler 12, and end plates 13.

The fuel cell stack 10 according to the present embodiment is configured such that the plurality of cell units are connected in series depending on the load of an electronic equipment. The present embodiment is directed to a structural example in which four cell units are connected to each other.)

Figure 7:
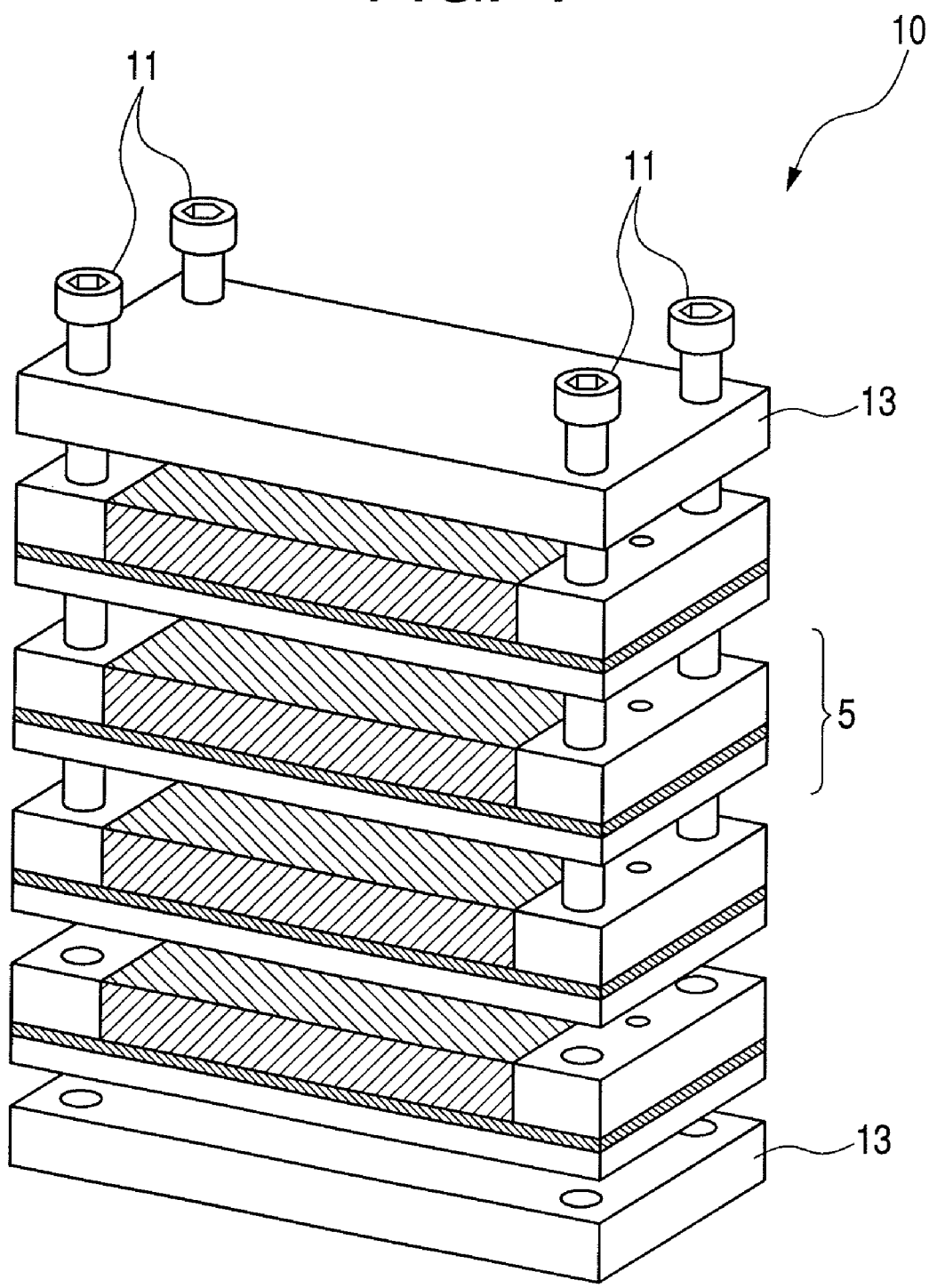
FIG. 7 is a perspective view for explaining the structure of the fuel cell stack according to the embodiment of the present invention.

The cell units each have the bolt holes and the fuel flow path and are stacked as illustrated in FIG. 7 to be sandwiched by the two end plates 13.

The stack bolts 11 are allowed to pass through the bolt holes so that the fuel cell units are clamped. In this case, in order to prevent the cell units and the end plates 13 from short-circuiting, it is desirable that bolts having electrical insulation property be used or an insulating member be inserted between each of members having possibility of coming into contact with the bolt, and each of the bolts. As a result, the cell units are electrically connected in series, and the fuel electrodes of the fuel cell units are connected by the fuel flow paths.

Further, in the structure in which the fuel cell units are electrically stacked in series, the electrode plates on the fuel electrode side and on the oxidizer electrode side are each configured to be common to the separator, thereby forming a bipolar plate.

Figure 4:
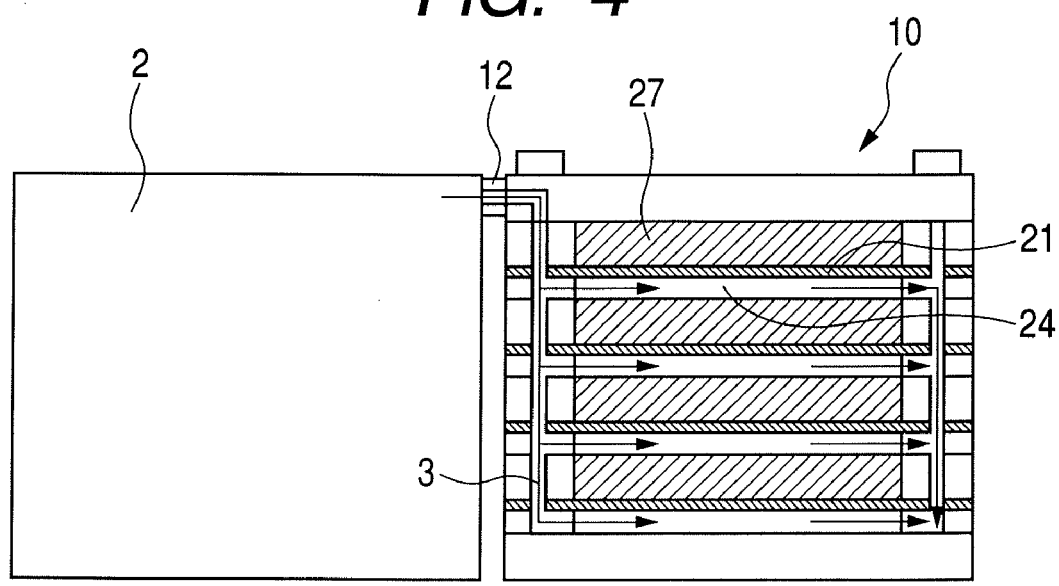
FIG. 4 is a cross-sectional view for explaining the structure of the fuel cell stack according to the embodiment of the present invention.

As illustrated in FIG. 4, the fuel tank 2 is connected to the fuel flow path of the fuel cell stack 10 through the coupler 12.

Fuel is supplied to the fuel cell units through the fuel flow path as illustrated by arrows in FIG. 6. Furthermore, air as the oxidizer is supplied, by natural diffusion, an air supply fan or the like, from a portion on a side surface of the fuel cell stack, where the oxidizer flow path forming members 27 are exposed.

In each of the cell units constituting the fuel cell stack, the oxidizer flow path forming member is disposed at the oxidizer flow rate regulating portion as described above.

In the present embodiment, as shown in FIG. 8, when the conductance at the inside of the oxidizer flow path forming member 27 is defined as $C1$, and the conductance at the opening portion at which the oxidizer flow rate regulating portion 30 is disposed is defined as $C2$, cells having $C1/C2$ larger than $C1/C2$ of the cells located at the both ends are disposed at the inner side except the both end positions of the fuel cell stack.

The magnitude relationships between $C1$ and $C2$ of the respective cell units are all $C1>C2$. Accordingly, the air supply amount is regulated by the small conductance $C2$. Consequently, air is more difficult to flow in the cell unit having a larger $C1/C2$.

Therefore, the airflow relatively increases in the cell units at both ends in the stacking direction of the fuel cell stack, while the airflow relatively decreases in the cell units at the central part of the fuel cell stack.

According to the fuel cell stack of the present embodiment, the structures of the oxidizer flow paths of the respective cell units are designed with respect to the temperature distribution of the fuel cell stack in the stacking direction, whereby the fuel cell stack can stably be driven.

Specifically, the fuel cell stack according to the present embodiment can prevent the flooding phenomenon from occurring at the cell units having relatively low temperatures.

Furthermore, the fuel cell stack according to the present embodiment can prevent the dry out phenomenon from occurring at the cell units having high temperatures.

Consequently, the variation in the power generation performance for each cell unit can be suppressed, whereby a fuel cell stack capable of stably generating power with a high output can be provided.

In the following, embodiments of the present invention will be described in detail.

Embodiment 1

A fuel cell stack having the structure described in the above-mentioned embodiment will be described as Embodiment 1.

Figure 9:
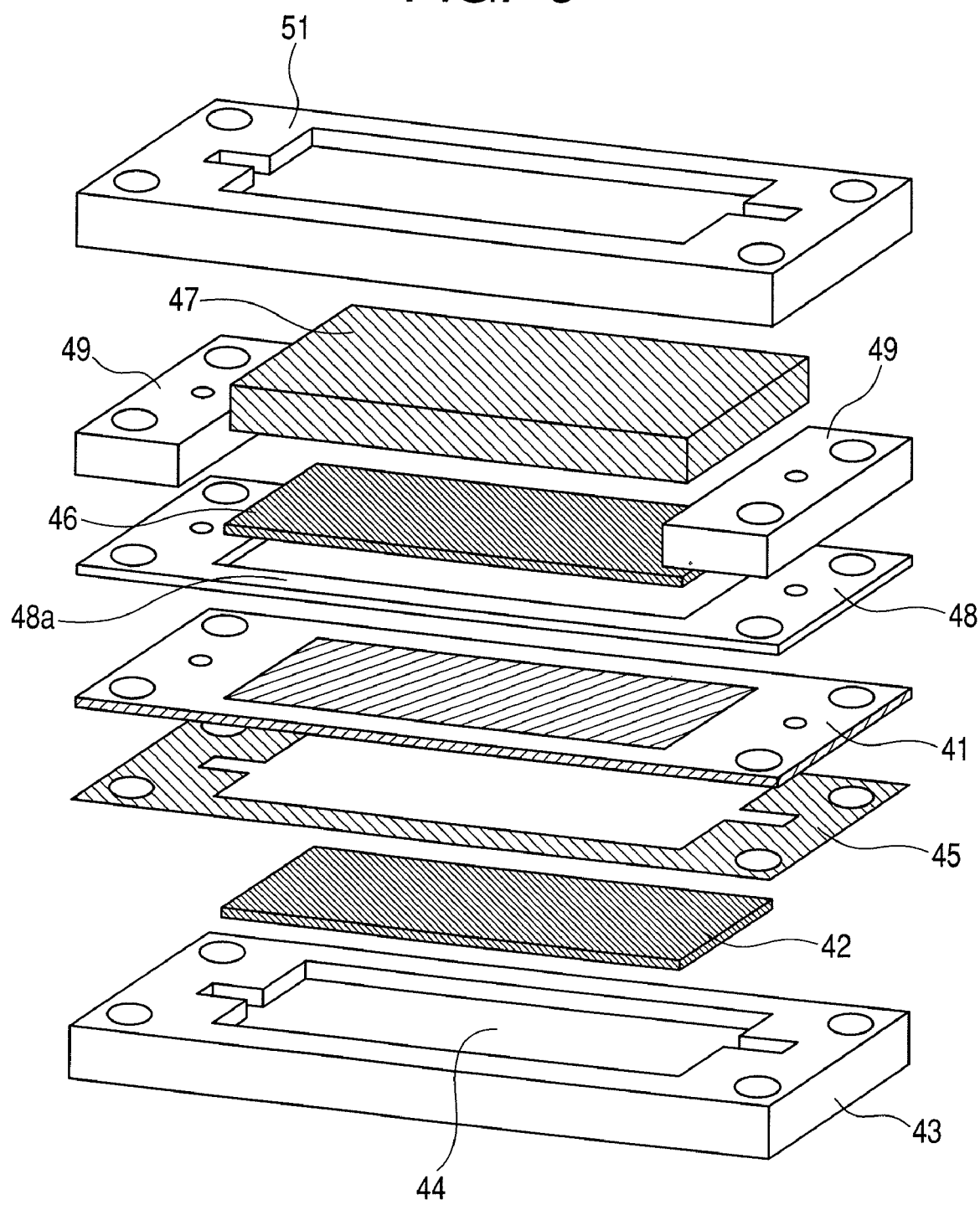
FIG. 9 is an exploded perspective view for explaining the structure of a fuel cell unit in a fuel cell stack according to Embodiment 1 of the present invention.

FIG. 9 is a schematic exploded perspective view for explaining the structure of the cell unit constituting the fuel cell stack according to the present embodiment.

Figure 10:
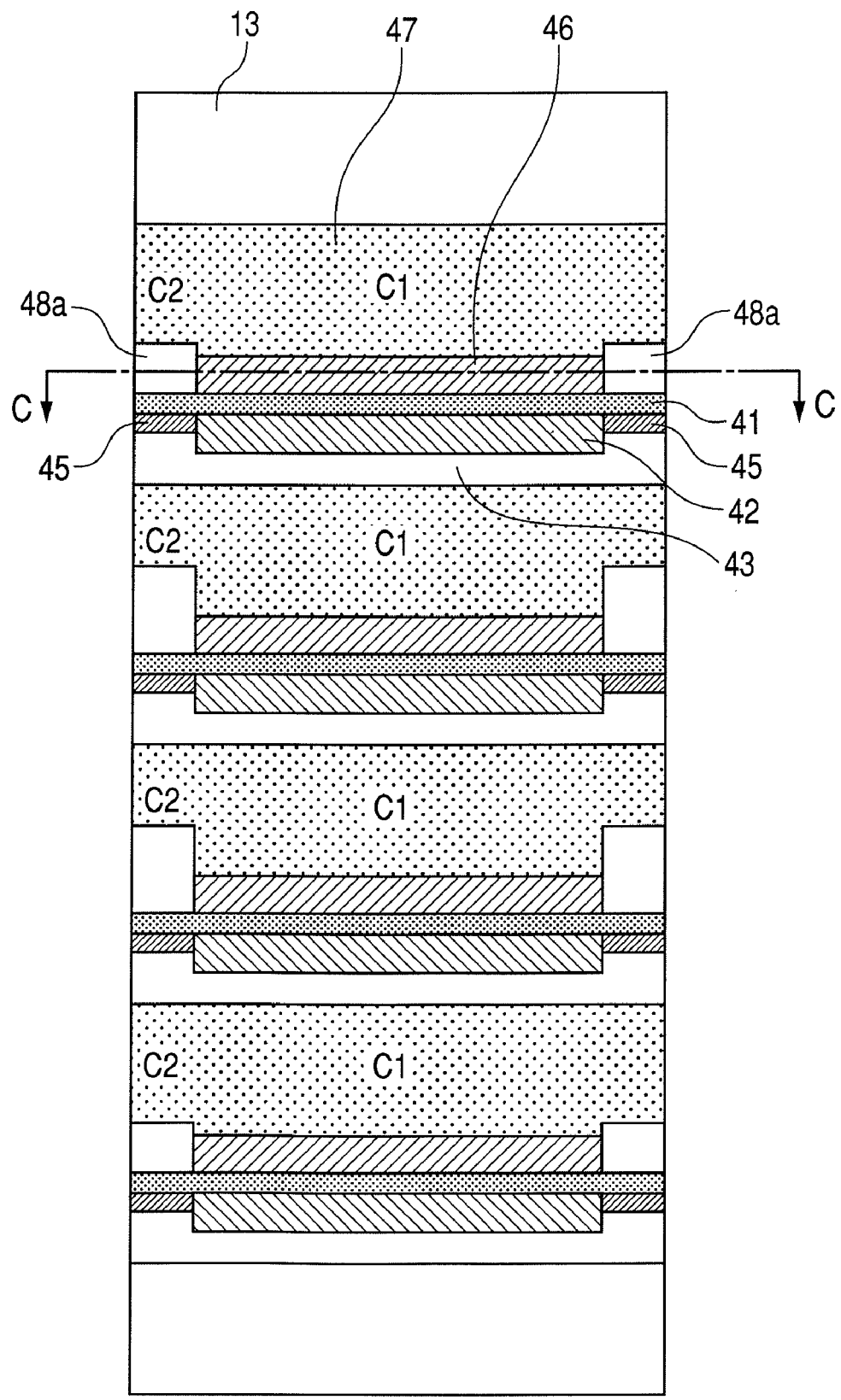
FIG. 10 is a cross-sectional view, taken along a line corresponding to line B-B in FIG. 5, for explaining the structure of the fuel cell stack according to Embodiment 1 of the present invention.

FIG. 10 is a cross-sectional view taken along a line corresponding to line B-B in FIG. 5.

FIG. 11 is a cross-sectional view of a support member 48, taken along a line corresponding to line C-C in FIG. 10.

In the present embodiment, a technology for designing the conductances $C1$ and $C2$ will be described based on the structure of the cell unit.

For the oxidizer flow path forming member, there is employed a metal foam obtained by porousifying stainless steel, a nickel chrome alloy, or the like. A material having less pressure drop, i.e., a material having a larger conductance of air circulation, is used as the metal foam 47.

The structure retaining member 49 and the support member 48 are each independently formed of a predetermined material. As shown in FIG. 9, it is configured such that the structure-retaining member 49 is provided on the support member 48.

Stainless steel is used for the material of each of the structure retaining member 49 and the support member 48. The total thickness of the gas diffusion layer and the metal foam is regulated by the total height of the structure retaining member and the support member at the time of clamping.

The support member 48 also has the function of the oxidizer flow rate-regulating portion. Specifically, the opening area of the metal foam can be adjusted by the thickness of a beam portion (beam member) 48a of the support member as shown in FIG. 11. For example, as shown in FIG. 1, the thickness of the beam member in each of the two fuel cell units at the inner side of the fuel cell stack is set to be larger than the thickness of the beam member in each of the fuel cell units located at the both ends of the fuel cell stack, whereby the opening area can be adjusted.

In this case, the metal foam has a protruding shape so as to be fitted to the beam portion of the support member. The protruding shape can be formed through a wire electrical discharge machining process in which the metal foam that is in contact with the support member is scraped off.

The metal foam, the support member, and the structure retaining member are superimposed and pressed before the fuel cell is assembled, whereby the fuel cell unit, in which the metal foam that is in contact with the support member is crashed while keeping the total thickness, can be formed beforehand.

By virtue of the configuration described above, the metal foam 47 serving as the oxidizer flow path forming member can have the conductance C2, which is smaller than the internal conductance C1, at the opening portion. Specifically, the opening portion itself can form the oxidizer flow rate regulating portion.

As shown in FIG. 10, the fuel cell stack according to the present embodiment is formed by stacking the plurality of cell units each including the beam member disposed between the oxidizer flow path forming member and the membrane electrode assembly. At this time, it can be adjusted in such a manner that the cell units located at the inner side have C1/C2 larger than C1/C2 of the cell units located at the both ends.

The value of C1/C2 can be varied by the opening area of the opening portion of the metal foam 47. If the C1's of the respective cell units in the fuel cell stack are set to be equal, the gas diffusion properties at regions immediately above the power generation surfaces of the respective cell units can be made equal, which is preferable.

In order to allow the C1's of the respective cell units to be equal and also to allow the C2's of the respective cell units to be different from one another, the total heights of the structure retaining member 49 and the height of the support member 48 of the respective cell units are made equal, and the ratio of the height of the structure retaining member and the height of the support member may be varied for each of the cell units.

Thus, the fuel cell stack can be configured in which the values of the conductance C1 of the respective fuel cell units constituting the fuel cell stack are approximately identical to each other, and at least one inner fuel cell unit except the fuel cell units located at the both ends of the fuel cell stack has a value of the conductance C2 which is smaller than the values of the conductance C2 of the fuel cell units located at the both ends of the fuel cell stack.

According to the present embodiment, the amount of air supplied to the cells at the both ends of the fuel cell stack, whose temperature is likely to be lowered, can be increased, while the amount of air supplied to the cell at the central part whose temperature is likely to increase, can be reduced.

Accordingly, the variation in the power generation performance between the respective cell units can be suppressed, whereby a fuel cell stack that can stably generate power with a high output can be provided.

Furthermore, the structure in which the beam portion of the support member and the metal foam are fitted to each other can facilitate the alignment between the components, whereby the assembling performance can be enhanced.

Examples

Subsequently described is a specific structure example of the fuel cell stack according to Embodiment 1 that is made by using representative materials and numerical values.

The structure of the cell unit used in the present example will firstly be described.

The outer shape of the cell unit was formed into a reed shape, and the width of the fuel cell unit was about 10 mm and the length thereof was about 35 mm.

A Nafion (tradename) membrane (manufactured by DuPont, NRE 212 CS) was used for the polymer electrolyte membrane.

After a polymer electrolyte solution was applied on the surface of a platinum deposit having microstructure formed by a sputtering process, the platinum deposit was subject to thermal compression bonding to the polymer electrolyte membrane from the both sides, whereby the membrane electrode assembly 41 was obtained.

The width of the polymer electrolyte membrane was about 10 mm, and the length thereof was about 35 mm, as with the outer shape of the fuel cell. A catalyst electrode was provided at the center of the electrolyte membrane. The reaction area of the catalyst electrode was about 2 $cm^2$.

The sealing material 45 was provided at the outer peripheral edge of the electrode plate 43 at the fuel electrode side in order to prevent the leakage of hydrogen from the fuel electrode chamber 44, so that a closed space was formed between the membrane electrode assembly 41 and the electrode plate 43 at the time of clamping.

On the oxidizer electrode side, as the gas diffusion layer, carbon cloth (manufactured by E-TEK) having a thickness of about 0.35 mm was disposed, and as the oxidizer flow path-forming member, a metal foam (manufactured by Sumitomo Electric Industries, Ltd.) was disposed. For the metal foam, there was employed a material containing, as a main component thereof, nickel-chrome having a high rigidity, and having a nominal pore diameter of about 900 μm and a porosity of about 95%.

The structure retaining member 49 and the support member 48 were independently formed by using a stainless steel material.

It was configured that the structure-retaining member 49 was provided on the support member 48, and the structure retaining member 49 and the support member 48 were disposed so as to cover the periphery of the carbon cloth 46 and so as to correspond to the sealing material 45 on the fuel electrode side.

The metal foam 47 was formed with a protruding shape that was fitted to the beam portion 48a of the support member 48. The thickness of the beam portion and the height of the convex portion were regulated so as to make the compression amount of the carbon cloth 46 equal.

Figure 12A:
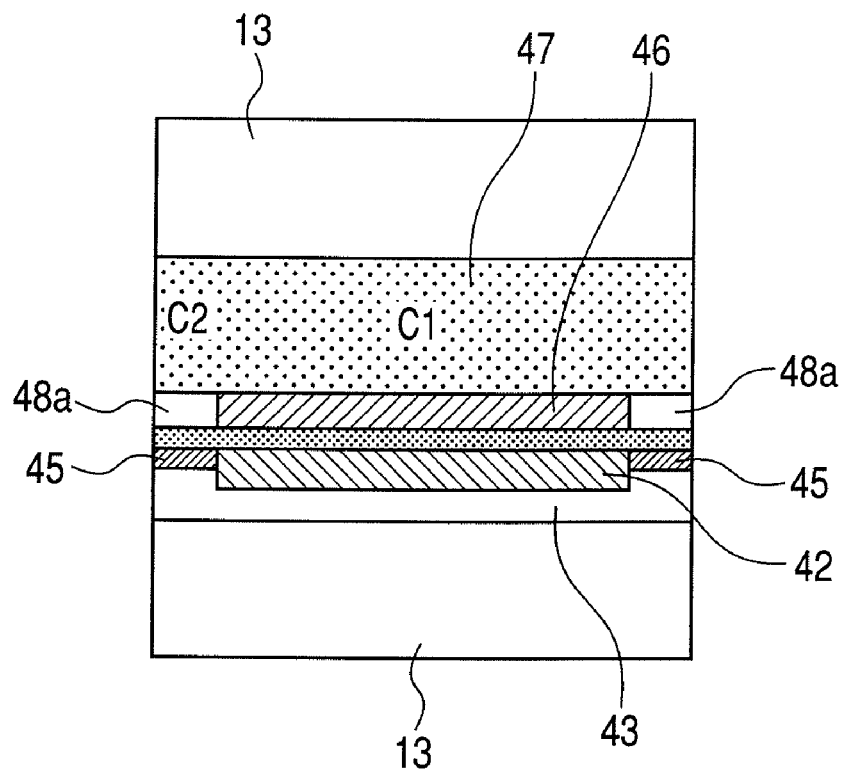
FIG. 12A and FIG. 12B are cross-sectional views, taken along a line corresponding to line B-B in FIG. 5, for explaining the structure of the fuel cell unit according to Embodiment 1 of the present invention.
Figure 13:
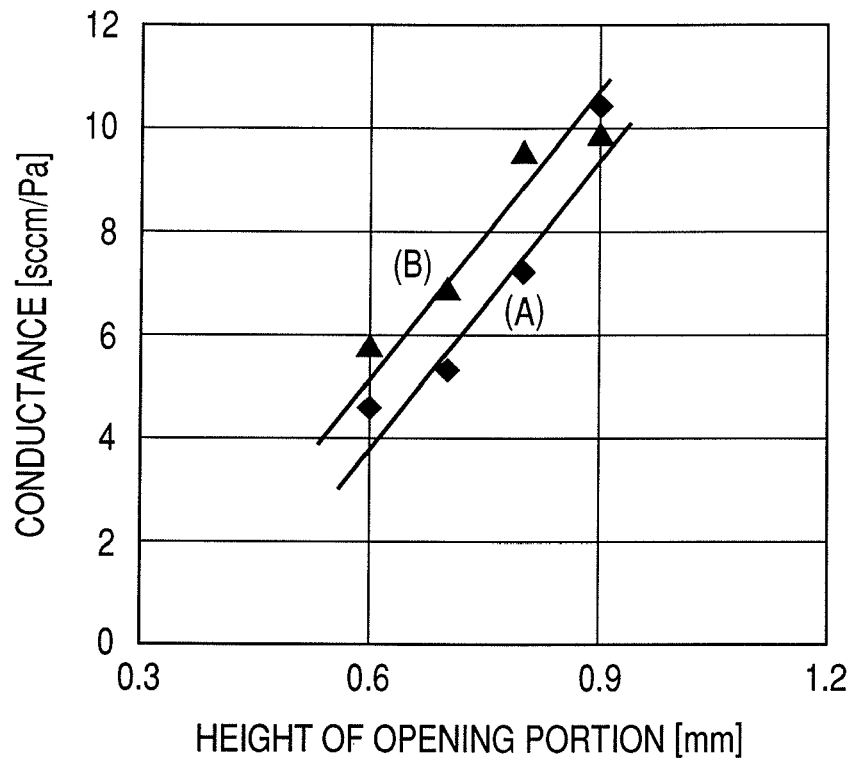
FIG. 13 is a graphical representation showing a relationship between the height of an opening portion of a fuel cell unit and a conductance according to an example of the present invention.

(A) in FIG. 13 shows a relationship of the conductance when the thickness of the metal foam 47 is changed in the cell unit, as shown in FIG. 12A, in which the height of the beam portion 48a of the support member 48 is made equal to the thickness of the carbon cloth 46 after the compression.

The conductance was defined as follows. An external manifold was provided at one side of the opening portion of the cell unit. A gradient was determined from the airflow rate when the supplied air passed through the metal foam and the pressure in the manifold, and the conductance was defined by the value of the airflow rate [sccm] per 1 Pa.

As shown in (A) in FIG. 13, the value of the conductance can be varied relative to the height of the opening portion with good controllability.

In this case, since the beam portion 48a of the support member 48 does not reduce the opening area of the metal foam 47, the thickness of the metal foam is the same as the height of the opening portion.

Figure 14:
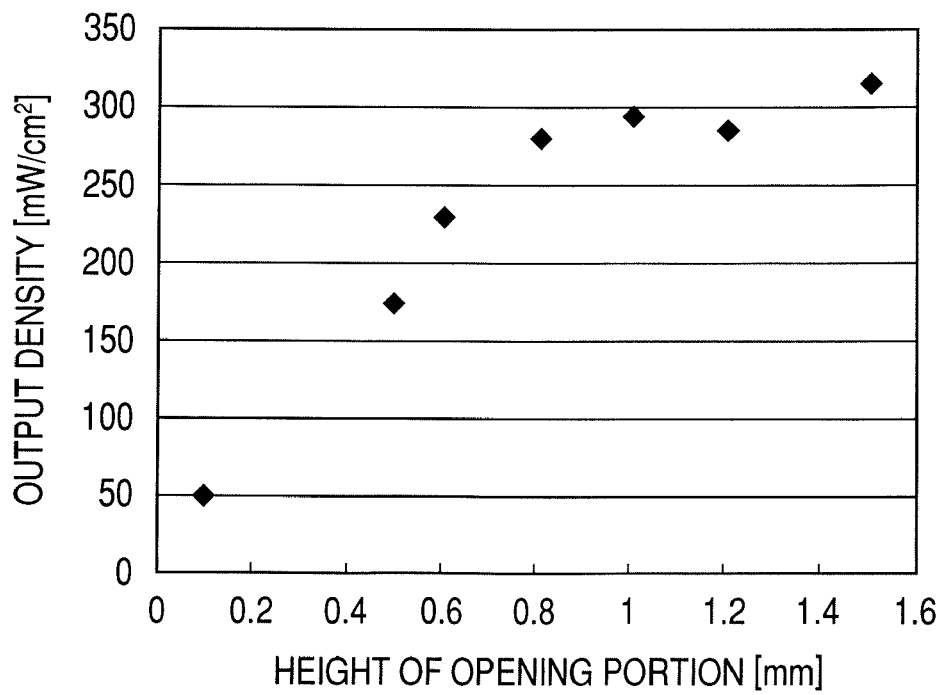
FIG. 14 is a graphical representation showing a relationship between the height of an opening portion of the fuel cell unit and the maximum output value according to the example of the present invention.

FIG. 14 shows a relationship between the height of the opening portion and the maximum output density of the cell unit when the applied pressure was adjusted so as to supply air in a fixed rate of 20 sccm.

It can be seen from FIG. 14 that even when the air supply amount itself is constant, there is a minimum height of the opening portion required for taking out a certain output.

In general, when the output density of the cell unit is 100 mW/cm$^2$ or more, the cell unit can be employed for various purposes. Therefore, the height of the opening portion of the metal foam is preferably 0.4 mm or more.

(B) in FIG. 13 shows the relationship between the conductance and the height of the opening portion of the fuel cell unit used in the present embodiment.

Figure 12B:
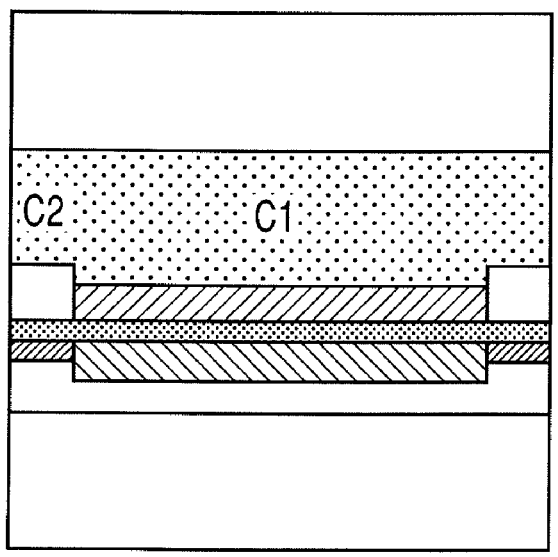

In the cell unit shown in FIG. 12B in which the metal foam 47 is fitted to the beam portion 48a of the support member 48, the thickness of the beam portion of the support member is variously changed, while keeping the sum of the height of the structure retaining member 49 and the height of the support member to be 1 mm. (B) in FIG. 13 shows the relationship between the conductance and the thickness of the beam portion.

The conductance measurement method is as described above. In this case, the conductance can also be varied relative to the height of the opening portion with good controllability. From this result, it can be seen that the conductance was regulated not by the height of the whole metal foam but by the height of the opening portion. Furthermore, the conductance C1 depends upon the height of the whole metal foam, while the conductance C2 depends upon the height of the opening portion.

The power generation temperature and the airflow rate were varied in various ways for each of the cell units having the structures shown in FIGS. 12A and 12B, and the stable output value was estimated for each cell unit.

Figure 15A:
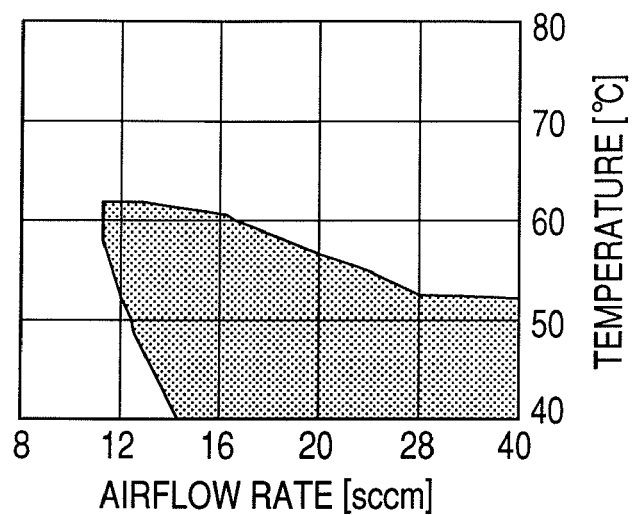
FIGS. 15A, 15B, and 15C are diagrams showing a stable output region with respect to the temperature and airflow rate of the fuel cell unit according to an example of the present invention.
Figure 15B:
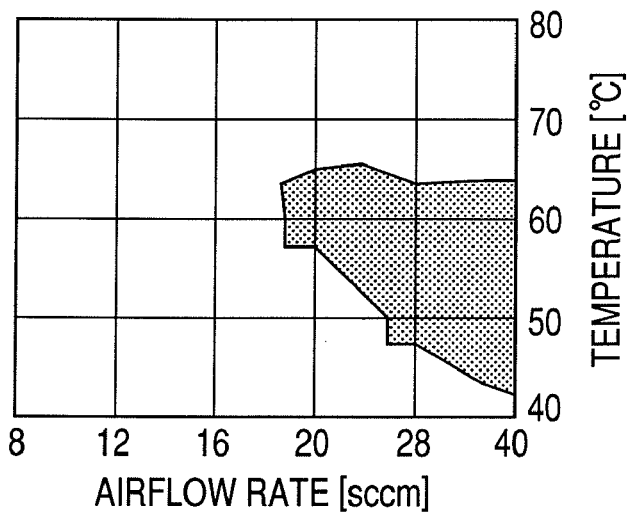
Figure 15C:
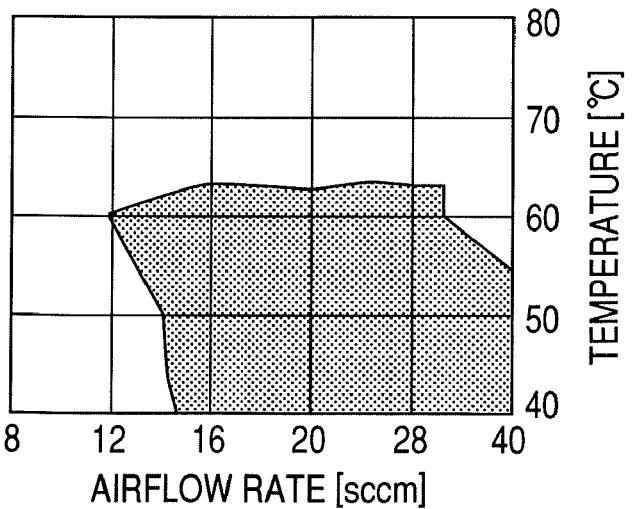

In FIGS. 15A, 15B, and 15C, the stable output values of the cell units were plotted on the map having two axes that were the power generation temperature and the airflow rate, wherein the region whose output value was a certain optional value or more was enclosed.

The power generation temperature of the cell unit was adjusted by means of a heater. The used output was measured after the cell unit was driven for 30 minutes at a current density of 350 mA/cm$^2$. The output region in which output was 230 mW/cm$^2$ or more was enclosed in a contour-like fashion.

FIG. 15A shows the result of the case in which the sum of the height of the structure retaining member 49 and the height of the support member 48 is set to be 1 mm, and the thickness of the beam portion 48a of the support member is set to be 0.1 mm in the cell unit shown in FIG. 12A.

The carbon cloth 46 is compressed to 0.1 mm, and the height (height of the whole metal foam) of the opening portion is 0.9 mm.

FIG. 15B shows the result of the case in which the sum of the height of the structure retaining member and the height of the support member is set to be 0.7 mm, and the thickness of the beam portion of the support member is set to be 0.1 mm in the cell unit shown in FIG. 12A.

In this case, the carbon cloth is also compressed to 0.1 mm, and the height (height of the whole metal foam) of the opening portion is 0.6 mm.

FIG. 15C shows the result of the case in which the sum of the height of the structure retaining member and the height of the support member is set to be 1 mm, and the thickness of the beam portion of the support member is set to be 0.4 mm in the cell unit shown in FIG. 12B. The height of the protruding surface of the metal foam is regulated, whereby the carbon cloth is compressed to 0.1 mm at the time of clamping.

The height of the whole metal foam is 0.9 mm, while the height of the opening portion is 0.6 mm.

In FIG. 15A, the stable region is the region having low temperature and the airflow rate is low. Therefore, it can be seen that this structure has resistance to the flooding phenomenon.

On the other hand, in the region at the upper-right section where the temperature is high and the airflow rate is high, the output is reduced. Therefore, it can be seen from this result that this structure is sensitive to the dry environment.

The stable region exists in the region at the upper-left section where the airflow rate is small although the temperature is high. Therefore, it can be seen from this result that in order to impart resistance against the dry environment, the airflow rate may be reduced even with the state in which the temperature is high.

In order to reduce the airflow rate in the structure shown in FIG. 15A, the structure shown in FIG. 15B or FIG. 15C in which the height of the opening portion of the metal foam is reduced as shown in FIG. 13 may be employed. In contrast with FIG. 15A, in FIG. 15B, the stable region is shifted to the upper-right section where the airflow rate is large and the power generation temperature is high. Furthermore, the stable region becomes narrower.

The output is reduced in the region having low temperature and the airflow rate is small. Therefore, this result shows that the cell unit having the structure described above has resistance against the dry environment, but on the contrary, the flooding phenomenon is likely to occur in the wet environment.

This result simply indicates that the effect of increasing the stable region cannot be obtained only by reducing the height of the whole metal foam.

In contrast with FIG. 15A, the stable region in FIG. 15C is increased to the region where the temperature is high and the airflow rate is large, while keeping the region where the temperature is small and the airflow rate is small, although this region is slightly reduced.

This result shows that the cell unit having the structure described above has resistance to the flooding phenomenon and resistance to the dry environment.

That is, in the cell unit having the structure in which the relationship of C1>C2 is established in the relation between the conductances C1 and C2 of the metal foam, the resistance to the dry environment can be enhanced, while keeping the resistance to the flooding phenomenon.

The value of C2 is varied by the thickness of the beam portion of the support member, whereby the airflow rate can be controlled, and the stable region can be shifted in the lateral direction.

Figure 16:
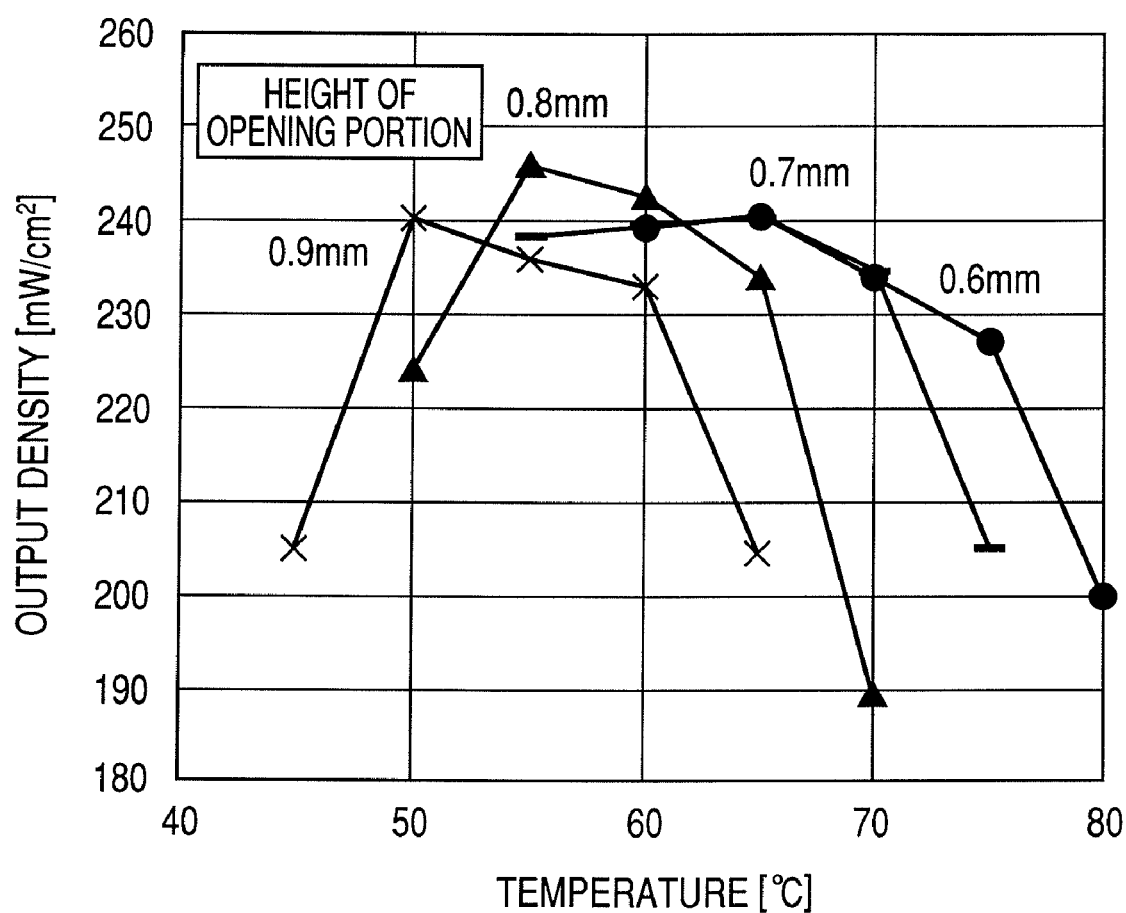
FIG. 16 is a graphical representation showing a relationship between the height of the opening portion of the fuel cell unit, temperature, and output value according to the example of the present invention.

FIG. 16 shows the output values with respect to the respective temperatures, when the thickness of the beam portion of the support member is changed so as to vary the height of the opening portion in the cell unit to which air is supplied at a constant flow rate.

The used output value was measured after the cell unit was driven for 60 minutes at a current density of 350 mA/cm$^2$. From the figure, the optimum temperature regions can be established according to the height of the opening portion of the metal foam.

The fuel cell stack according to the present example was formed by stacking the above-mentioned cell units in plurality.

Considering that the temperature distribution in the stacking direction of the fuel cell stack was such that the temperature was low at the both ends and high at the central part, a configuration was adopted in which a distribution was given to the conductance of air in the stacking direction.

A stack having 12 cell units stacked will be described as the fuel cell stack according to the present example.

A stack having 12 cell units stacked was manufactured. In each cell unit, the configuration of the oxidizer flow path is not different, i.e., the thickness of the metal foam and the height of the opening portion are the same.

The thickness of the metal foam was 1 mm, and the height of the opening portion was 0.9 mm. The temperature the stack reached was measured when the fuel cell stack was driven at a rated current of 350 mA/cm$^2$. The stack was placed under the environment of a temperature of 25° C. and a humidity of 50%. Air having the same temperature and humidity as that of the environment was supplied.

A cooling member in which water of 35° C. was circulated was pressed against the portions at the side surface of the stack where the structure-retaining members were laid out.

The temperature of the fuel cell stack was raised from the beginning of the activation, and the temperature became substantially constant after several minutes.

In this case, the cell units at the both ends of the stack had a temperature of about 55° C., the second cell units from the ends had the temperature of about 6° C., and the third cell units from the ends had the temperature of about 65° C., respectively.

The temperatures of the other inner cell units were substantially the same and about 70° C.

In the stack in which the oxidizer flow path was not designed with respect to the temperature distribution, the flooding phenomenon was likely to occur at the cell units at the both ends. Furthermore, when the air supply amount was increased in order to avoid the flooding phenomenon, the dry out phenomenon was likely to occur at the cell units at the central part.

Even when the air supply amount was varied, the region where the stack was stably driven was not found. Consequently, the characteristics were unstable.

In view of this, in the fuel cell stack according to the present example, the height of the opening portion of the metal foam having the thickness of 1 mm was varied so as to correspond to the temperature distribution. The relationship between the temperature and the height of the opening portion was set with reference to FIG. 16.

The height of the opening portion of each of the cell units at the both ends, which had the temperature of about 55° C. after the stabilization, was set to 0.9 mm, and the height of the opening portion of each of the second cell units from the ends, which had the temperature of about 6° C., was set to 0.8 mm.

The height of the opening portion of each of the third cell units from the ends, which had the temperature of about 65° C., was set to 0.7 mm, and the height of the opening portion of each of the other cell units, which had the temperature of about 70° C., was set to 0.6 mm.

By virtue of this structure, the amount of air supplied to the cell units at the both ends having low temperature was increased, while the amount of air supplied to the inner cell units having high temperature was reduced.

The fuel cell stack according to the present example was able to be stably driven at 350 mA/cm$^2$ in a state where the power generation temperature reached the estimated temperature range.

That is, the fuel cell stack according to the present example has an effect such that the flooding phenomenon at the both ends having low temperature can be suppressed, while the dry out phenomenon at the central part having high temperature can be suppressed.

Furthermore, even when the power generation environmental temperature was set to be low supposing the case where the stack temperature was not sufficiently raised, there was not caused the situation where that the flooding phenomenon is likely to occur at the cell units at the central part.

Comparative Example

As a comparative example of the stack according to the above-mentioned example, a fuel cell stack having plural cell units stacked was manufactured. Each cell unit had a structure shown in FIG. 12A in which the flow rate was not regulated by the beam portion 48a of the support member 48.

The structure of the fuel cell in the comparative example was the same as that of the fuel cell unit in Example 1 with the exception that the height of the opening portion of the metal foam 47 was not reduced by the beam portion of the support member. The fuel cell stack in the comparative example has 12 cell units stacked.

Figure 17:
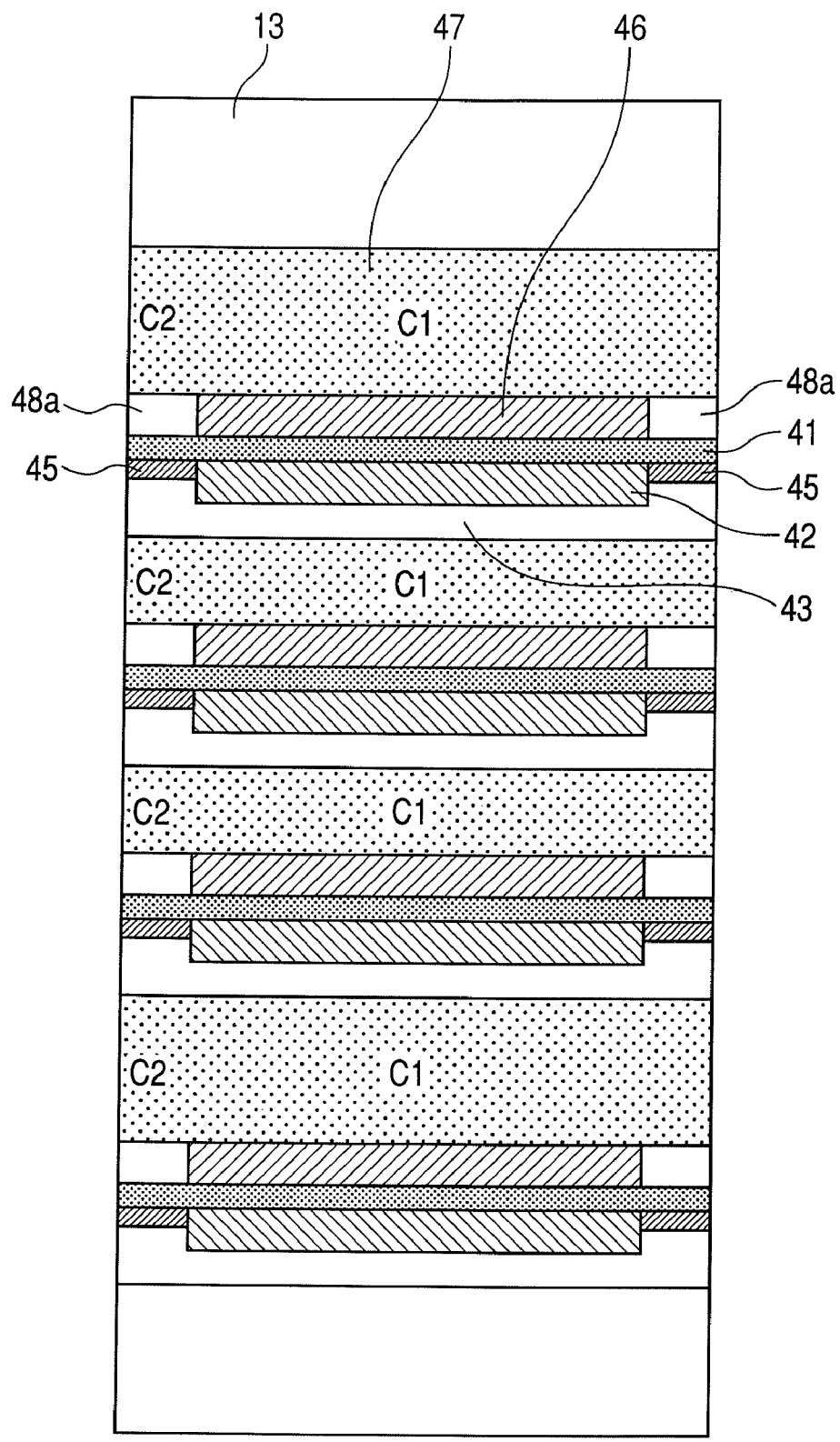
FIG. 17 is a cross-sectional view, taken along a line corresponding to line B-B in FIG. 5, for explaining the structure of the fuel cell stack according to an example of the present invention and a comparative example.

FIG. 17 is a cross-sectional view, taken along a line corresponding to line B-B in FIG. 5, for explaining the structure of the fuel cell stack according to the comparative example (showing configuration example in the figure, four cell units was connected). In this fuel cell stack, the airflow rate was controlled by changing the whole height of the metal foam as indicated in (A) of FIG. 13.

At the both ends having low temperature, the whole height of the metal foam was increased to increase the airflow rate, while the whole height of the metal foam was reduced so as to reduce the airflow rate at the central part having high temperature.

The whole height of the metal foam was selected from the relationship of the output value according to each temperature, when the whole height of the metal foam was changed, as with the relationship indicated in FIG. 16.

When the power generation temperature of the fuel cell stack reached the estimated temperature range, the fuel cell stack according to the comparative example was able to be stably driven.

That is, there was exhibited the effect that the flooding phenomenon at the both ends having low temperature could be suppressed, while the dry out phenomenon at the central part having high temperature could be suppressed.

However, when the power generation environmental temperature was set to be low supposing the case where the stack temperature did not sufficiently rise, degradation of the characteristics was observed at the cell units at the central part due to the flooding phenomenon.

Embodiment 2

In Embodiment 2, a fuel cell stack having a configuration different from the configuration in the example to which the embodiment is applied will be explained.

The fuel cell stack according to the present embodiment has the configuration basically same as that of Embodiment 1 shown in FIG. 9 with the exception that a beam member 50 constituting a structure shielding member for reducing the opening area is formed separately at the oxidizer electrode side electrode plate 51.

Figure 18:
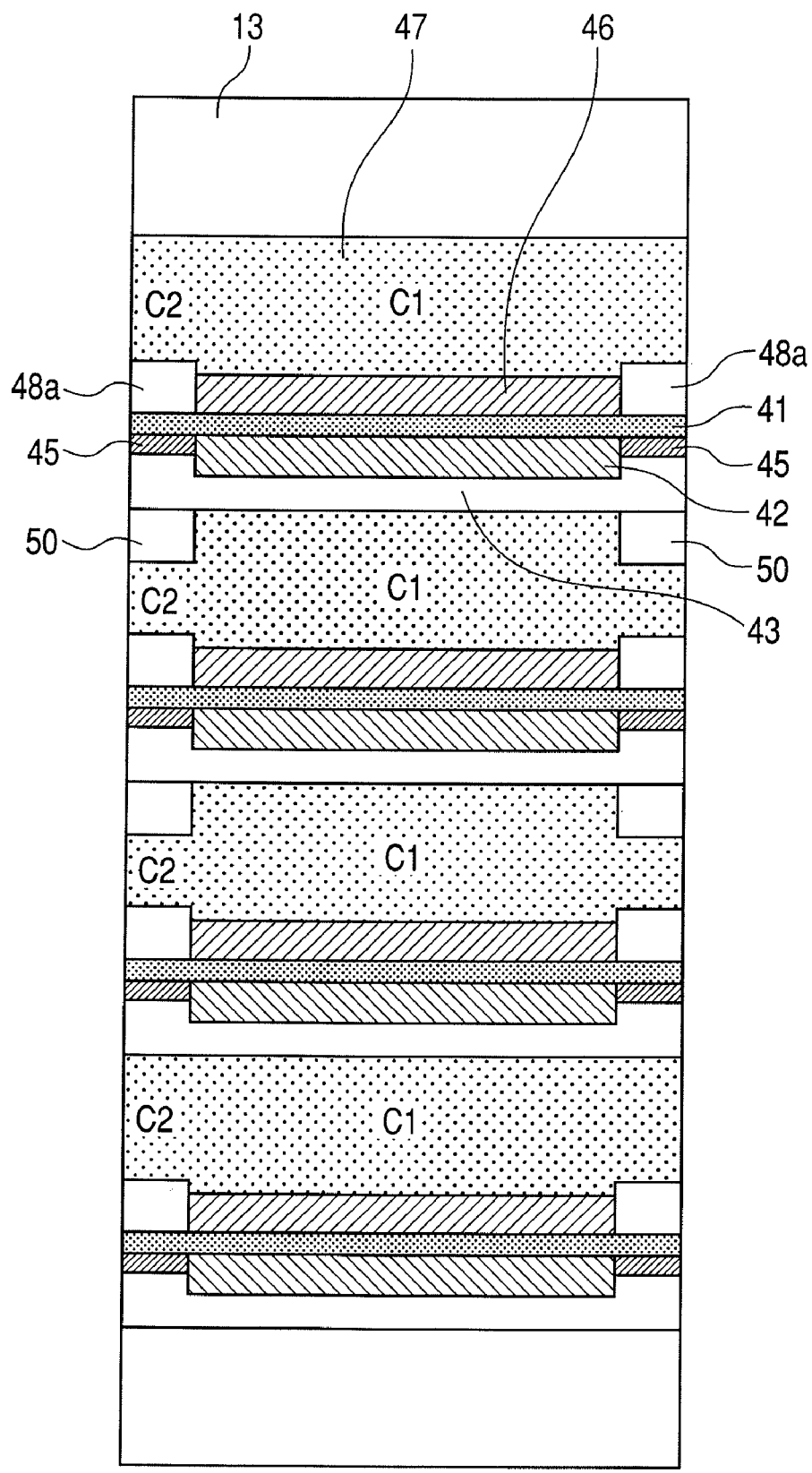
FIG. 18 is a cross-sectional view, taken along a line corresponding to line B-B in FIG. 5, for explaining the structure of the fuel cell stack according to Embodiment 2 of the present invention.

FIG. 18 is a cross-sectional view, taken along a line corresponding to line B-B in FIG. 5, for explaining the structure of the fuel cell stack in the fuel cell according to the present embodiment.

In the present embodiment, the same member is used for the support member 48. The beam member 50 is additionally disposed between the metal foam, which constitutes the oxidizer flow path forming member, and the electrode plate (separator). The height of the opening portion of the metal foam is regulated by the thickness of the beam member, whereby the relationship between the conductances C1 and C2 can be provided.

Furthermore, the relationship between the stable output value according to each temperature when the height of the opening portion of the cell unit having the structure described above is varied is the same as that in Embodiment 1.

The fuel cell stack according to the present embodiment is formed by stacking plural cell units having the structure described above.

According to the structure of the present embodiment, the conductances of the respective cell units are adjusted to increase at the both ends and are adjusted to decrease at the central part according to the temperature distribution in the stacking direction, whereby the fuel cell stack can more stably be driven.

Moreover, since the beam member 50 is disposed on the electrode plate 51 side, both of them can be integratedly formed.

In addition, since the metal foam 47 is fitted to both the beam portion 48a of the support member 48 and the beam member 50 on the electrode side, the fuel cell stack has a fitted structure, which results in easy assembling.

Embodiment 3

In Embodiment 3, a fuel cell stack different in structure from those in the above-mentioned embodiments will be described.

The configuration of the fuel cell stack in the present embodiment is basically the same as that in Embodiment 1 shown in FIG. 9, with the exception that the formation of the metal foam 47 is featured as described later.

In the present embodiment, the same member is used for the support member 48, and the thickness of the beam portion 48a is not varied.

Figure 19:
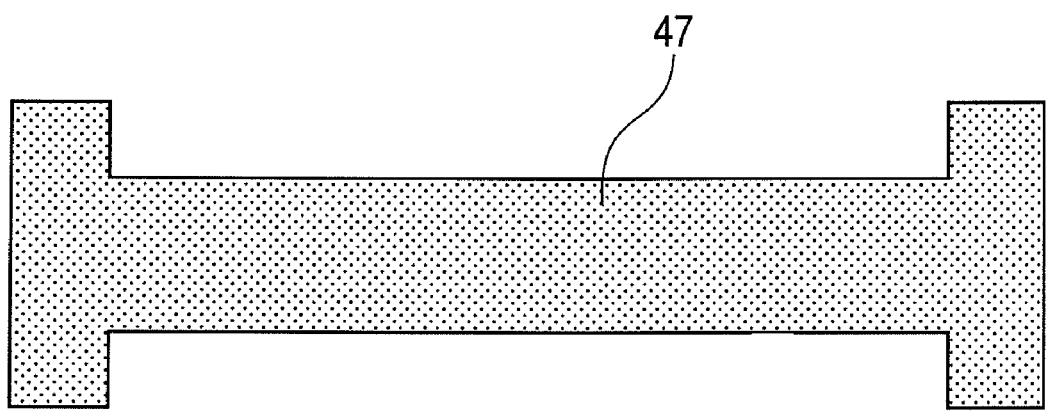
FIG. 19 is a view for explaining the structure of a metal foam in a fuel cell stack according to Embodiment 3 of the present invention.

The metal foam 47 for example, is prepared as a structure including an opening portion with a large thickness as shown in FIG. 19.

Before the fuel cell is assembled, the metal foam having the above-mentioned structure, the support member, and the structure-retaining member are superimposed and pressed, whereby the metal foam is formed to have a protruding shape.

In this case, the crushed amount is larger at the opening portion than the other portions of the metal foam. Therefore, the porosity is relatively reduced at the opening portion. That is, the opening portion itself forms the oxidizer flow rate regulating portion.

Accordingly, the relationship between the conductance C1 and the conductance C2 can be imparted to the metal foam.

The fuel cell stack according to the present embodiment is formed by stacking plural cell units having the structure described above.

According to the present embodiment, the conductances of the respective cell units are adjusted to increase at the both ends and are adjusted to decrease at the central part according to the temperature distribution in the stacking direction, whereby the fuel cell stack can more stably be driven.

Embodiment 4

In Embodiment 4, a fuel cell stack different in structure from those in the above-mentioned embodiments will be described.

The configuration of the fuel cell stack in the present embodiment is basically the same as that in Embodiment 1 shown in FIG. 9, with the exception that the relationship between C1 and C2 is defined as described later.

Figure 20:
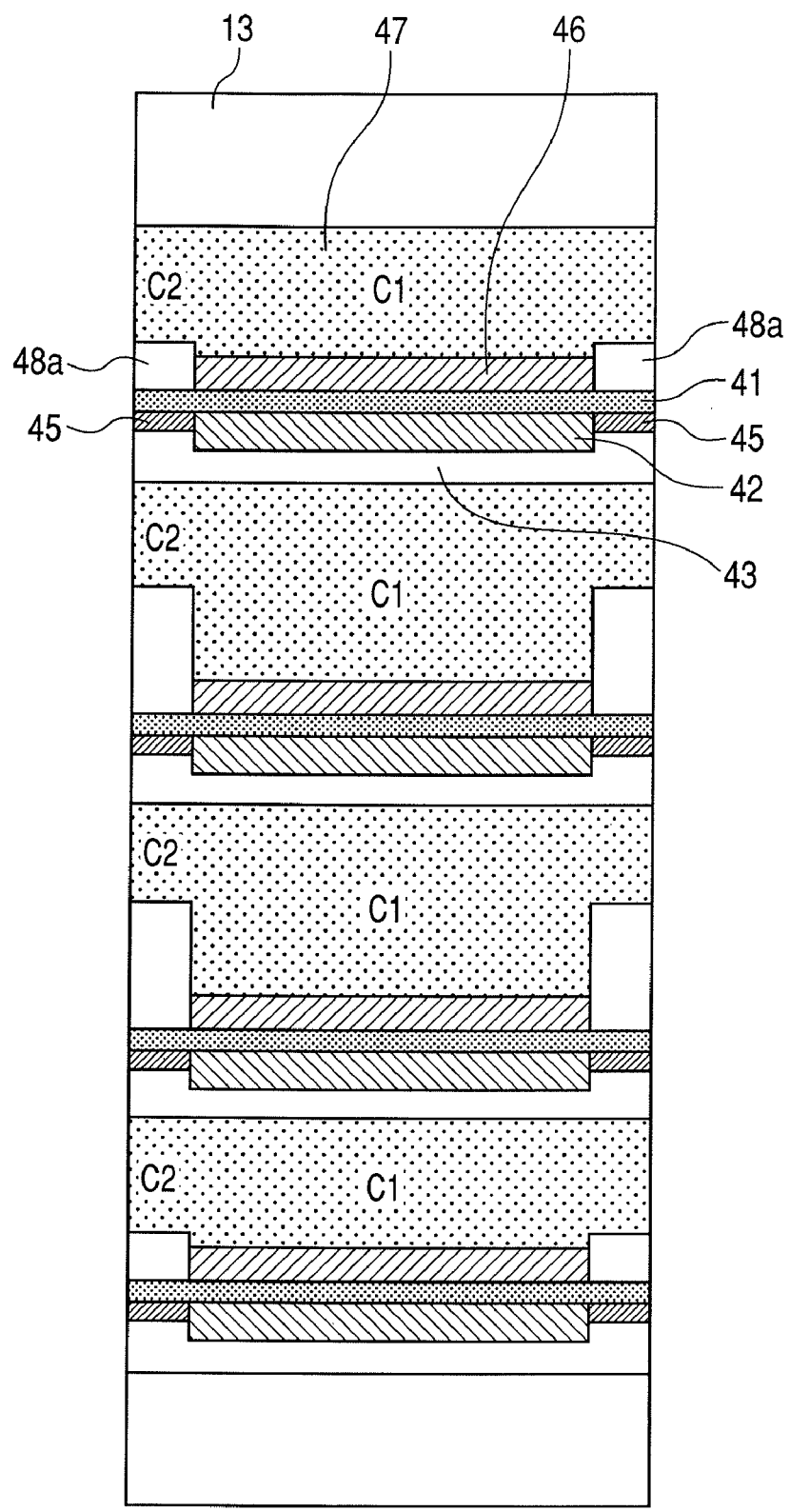
FIG. 20 is a cross-sectional view, taken along a line corresponding to line B-B in FIG. 5, for explaining the structure of a fuel cell stack according to Embodiment 4 of the present invention.

FIG. 20 is a cross-sectional view, taken along a line corresponding to line B-B in FIG. 5, for explaining the structure of the fuel cell stack in the fuel cell according to the present embodiment.

In the present embodiment, the conductance C1 at the inner part of the metal foam 47 in each of the inner cell units is larger than the conductance C1 in each of the cell units located at the both ends of the stack, while the conductance C2 at the opening portion in each of the inner cell units is smaller than the conductance C2 in each of the cell units at the both ends of the stack.

Specifically, the whole height of the metal foam 47 in each of the inner cell units is larger than the whole height in each of the cell units located at the both ends of the stack, and the height of the opening portion of the metal foam defined by the beam portion 48a of the support member 48 in each of the inner cell units is smaller than that in each of the cell units located at the both ends of the stack.

By virtue of the structure in the present embodiment, the amount of air supplied to the cell units at the both ends of the fuel cell stack which is likely to have low temperature can be increased, while the amount of air supplied to the cell units at the central part which is likely to have high temperature can be reduced.

Accordingly, the flooding phenomenon can be suppressed in the cell units at the both ends having low temperature.

Further, the dry out phenomenon can be suppressed in the cell units at the central part having high temperature.

Additionally, the resistance to the flooding phenomenon in the cell units at the central part, which phenomenon might be caused when the power generation temperature of the stack cannot sufficiently be raised, can further be enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-036601, filed Feb. 18, 2008, which is hereby incorporated by reference in its entirety.

What is claimed is:

1. A fuel cell stack comprising at least three fuel cell units stacked via separators, each fuel cell unit having:
    a membrane electrode assembly having a fuel electrode and an oxidizer electrode disposed at both sides of a polymer electrolyte membrane;
    an oxidizer flow path forming member disposed on the oxidizer electrode side and having an opening portion for supplying an oxidizer therethrough; and
    an oxidizer flow rate regulating portion disposed at the opening portion of the oxidizer flow path forming member, for regulating a flow rate of the oxidizer flowing in the oxidizer flow path forming member,
    wherein when a flow rate [sccm] per given pressure of the oxidizer in the oxidizer flow path forming member is defined as a conductance $C1$, and a flow rate [sccm] per given pressure of the oxidizer at the opening portion at which the oxidizer flow rate regulating portion is disposed is defined as a conductance $C2$, the conductances have a relationship of $C1>C2$, and at least one inner fuel cell unit except the fuel cell units located at both ends of the fuel cell stack has a value of $C1/C2$ which is larger than values of $C1/C2$ of the fuel cell units located at both ends of the fuel cell stack.

2. The fuel cell stack according to claim 1, wherein the values of the conductance $C1$ of the respective fuel cell units constituting the fuel cell stack are approximately identical to each other, and at least one inner fuel cell unit except the fuel cell units located at both ends of the fuel cell stack has a value of the conductance $C2$ which is smaller than values of the conductance $C2$ of the fuel cell units located at both ends of the fuel cell stack.

3. The fuel cell stack according to claim 1, wherein the value of the conductance $C1$ of the inner fuel cell unit is larger than the value of the conductance $C1$ of each of the fuel cell units at both ends, and the value of the conductance $C2$ of the inner fuel cell unit is smaller than the value of the conductance $C2$ of each of the fuel cell units at both ends.

4. The fuel cell stack according to claim 1, wherein the oxidizer flow path-forming member comprises a metal foam.

5. The fuel cell stack according to claim 1, wherein the oxidizer flow rate regulating portion comprises a member for reducing the opening area of the opening portion.

6. The fuel cell stack according to claim 5, wherein the member for reducing the opening area of the opening portion is composed of a structure-shielding member for reducing the opening area.

7. The fuel cell stack according to claim 6, wherein the structure-shielding member is a beam member.

8. The fuel cell stack according to claim 7, wherein the beam member is disposed between the oxidizer flow path forming member and the membrane electrode assembly.

9. The fuel cell stack according to claim 7, wherein the beam member is disposed between the oxidizer flow path forming member and the separator.

10. The fuel cell stack according to claim 8, wherein the thickness of the beam member of the inner fuel cell unit constituting the fuel cell stack is larger than the thickness of the beam member of each of the fuel cell units located at both ends of the fuel cell stack.

11. The fuel cell stack according to claim 9, wherein the thickness of the beam member of the inner fuel cell unit constituting the fuel cell stack is larger than the thickness of the beam member of each of the fuel cell units located at both ends of the fuel cell stack.

12. The fuel cell stack according to claim 5, wherein the member for reducing the opening area of the opening portion is formed of means for deforming a part of the opening portion by compression.

* * * * *